United States Patent
Cheng

(10) Patent No.: US 6,223,235 B1
(45) Date of Patent: Apr. 24, 2001

(54) SCSI BUS BASED HIGH SPEED DATA SERVER

(75) Inventor: Fulin Cheng, Mundelein, IL (US)

(73) Assignee: Zenith Electronics Corporation, Glenview, IL (US)

( * ) Notice: Subject to any disclaimer, the term of this patent is extended or adjusted under 35 U.S.C. 154(b) by 0 days.

(21) Appl. No.: 09/070,202

(22) Filed: Apr. 30, 1998

(51) Int. Cl.$^7$ .................................................. G06F 13/00

(52) U.S. Cl. ............................................ 710/107; 710/33

(58) Field of Search ............................... 710/22, 28, 29, 710/33, 35, 107, 129

(56) References Cited

U.S. PATENT DOCUMENTS 5,881,245 * 3/1999 Thompson ........................... 709/219

* cited by examiner

Primary Examiner—Glenn A. Auve

(57) ABSTRACT

A data server includes an SCSI disk that stores data and an SCSI bus that is connected to the SCSI disk and that is arranged to transfer the data from the SCSI disk. An SCSI bus adapter is connected to the SCSI bus and initiates the transfer of the data from the SCSI disk. A host computer controls the SCSI bus adapter. An application is also connected to the SCSI bus. The application switches control of the SCSI bus from the SCSI bus adapter to the application, and the application controls the rate at which data is transferred from the SCSI disk to the application.

39 Claims, 13 Drawing Sheets

SCSI BUS BASED HIGH SPEED DATA SERVER

TECHNICAL FIELD OF THE INVENTION

The present invention relates to a data server and, more particularly, to a data server having a packet token generator that facilitates the delivery of data at any data rate within a wide range of data rates such that data rate error and packet timing jitter are acceptable.

BACKGROUND OF THE INVENTION

A hard disk based data server offers high speed random data accessing capability which is useful, for example, in digital video applications such as interactive video processing, non-linear video editing test video stream generation, and the like. The data servers that have been developed in the past for these applications primarily involve the use of the SCSI protocol because the SCSI protocol has many advantages including compatibility, expandability, and exchangeability. However, these data servers have been either low speed, low cost data servers, or high speed, high cost data servers.

A typical data server 10 implementing the SCSI protocol is illustrated in FIG. 1. The data server 10 includes an SCSI disk 12 for storing data which must be accessed and processed by an application 14. The application 14 accesses the data stored on the SCSI disk 12 through a host computer 16 and an SCSI bus adapter 18. The host computer 16 communicates with the SCSI bus adapter 18 over a host bus 20, and the SCSI bus adapter 18 is connected to the SCSI disk 12 by way of an SCSI bus 22.

One typical requirement demanded for the design of the data server 10 is that the host computer 16, the SCSI bus adapter 18, and the host bus 20 be able to handle the data flow at substantially the same data rates of the SCSI disk 12 and the application 14. While this requirement is technically feasible when the data rate is high, satisfying this requirement at high data rates results in the data server 10 being complicated and costly.

Moreover, unless the data server 10 is highly complicated, the data server 10 is not flexible, simple, or fast, because only the SCSI bus adapter 18 communicates with the SCSI disk 12. For example, as the application 14 processes data stored on the SCSI disk 12, it repeatedly starts and stops data flow from the SCSI disk 12 because the SCSI disk 12 delivers data at a rate which is faster than the processing rate of the application 14. However, all start and stop instructions from the application 14 must be passed to the SCSI disk 12 through the host computer 16 and the SCSI bus adapter 18, which tends to slow down data transfer.

Furthermore, the application 14 may issue data requests at a frequency which is higher than the required data transfer rate of the data file on the SCSI disk 12. The data server 10 must be able to compensate for the difference between the frequency of the data requests from the application 14 and the data transfer rate of the data file on the SCSI disk 12.

Accordingly, the present invention is directed to a packet token generator which achieves these performance requirements. The data server based on the present invention is fast, flexible and/or low cost compared to prior art data servers, particularly to prior art video servers.

SUMMARY OF THE INVENTION

In accordance with one aspect of the present invention, a data server comprises a storage disk, an SCSI bus, an SCSI bus adapter connected to the SCSI bus, a host computer, and an application. The storage disk stores data. The SCSI bus is connected to the storage disk and is arranged to transfer the data from the storage disk. The host computer is arranged to control the SCSI bus adapter. The application is connected to the SCSI bus, and the application is arranged to receive the data transferred by the SCSI bus and to control the transfer of the data from the storage disk.

In accordance with another aspect of the present invention, an SCSI data server comprises an SCSI memory, an SCSI bus connected to the SCSI memory, an SCSI controller, and an application. The SCSI memory stores data. The SCSI controller is connected to the SCSI bus and is arranged to initiate transfer of the data from the SCSI memory. The application is connected directly to the SCSI bus, and the application is arranged to use the data transferred over the SCSI bus and to control the transfer of the data from the SCSI memory after the transfer of the data has been initiated by the SCSI controller.

In accordance with yet another aspect of the present invention, a data server comprises a storage disk, an SCSI bus, an SCSI bus adapter connected to the SCSI bus, a host computer, and an application. The storage disk stores data. The SCSI bus is connected to the storage disk and is arranged to transfer the data from the storage disk. The host computer is arranged to control the SCSI bus adapter. The application is connected to the SCSI bus, and the application includes a switch arranged to switch control of the SCSI bus from the SCSI bus adapter to the application. The application includes a data rate controller arranged to control the rate at which data is transferred from the SCSI disk to the application.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
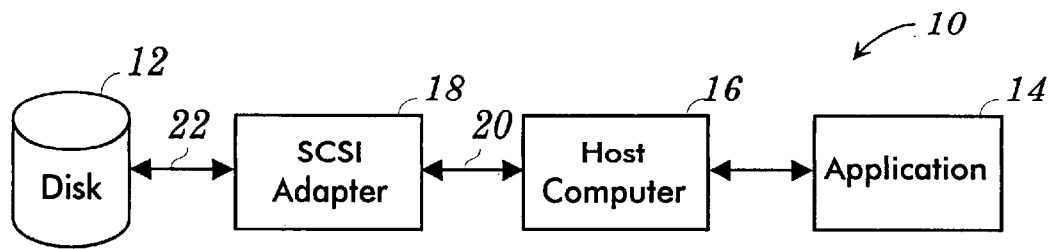
FIG. 1 illustrates a data server according to the prior art.
Figure 2:
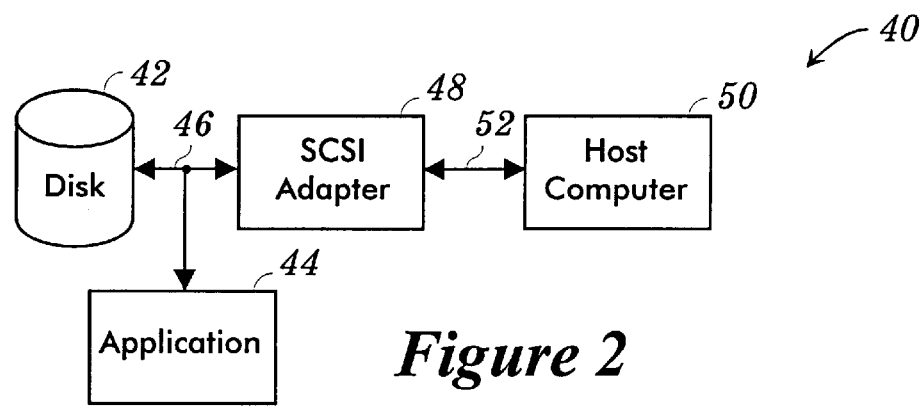
FIG. 2 illustrates a data server according to the present invention.

A data server 40 according to the present invention is illustrated in FIG. 2. The data server 40 includes an SCSI disk 42 on which data is stored. The data stored on the SCSI disk 42 is to be accessed and processed by an application 44. Data is supplied to the application 44 from the SCSI disk 42 over an SCSI bus 46. An SCSI bus adapter 48 is connected to the SCSI bus 46, and the SCSI bus adapter 48 is also connected to a host computer 50 over a host bus 52. The SCSI disk 42 shown in FIG. 2 may be the same disk as the SCSI disk 12 shown in FIG. 1, and the SCSI bus adapter 48 may be the same bus adapter as the SCSI bus adapter 18 shown in FIG. 1. The host computer 50 shown in FIG. 2 may be the same computer as the host computer 16 shown in FIG. 1 except that the host computer 50 is programmed to carry out the functions of the present invention as is discussed below. Moreover, the application 44 may be similar to the application 14 except that the application 44 is modified to directly control the rate at which data is read from the SCSI disk 42.

The host computer 50 initiates data transfer in blocks from the SCSI disk 42 to the application 44, but it is the application 44 that directly receives this data and controls the rate at which it reads data from the SCSI disk 42. Because the host computer 50 is not required to pass data from the SCSI disk 42 to the application 44, the host computer 50 has little need to receive data to be processed by the application 44. Therefore, the host computer 50 may be arranged to instruct the SCSI bus adapter 48 to disregard the data which is to be processed by the application 44 and which appears on the SCSI bus 46. However, the host computer 50 may be arranged to instruct the SCSI bus adapter 48 to pass other data, such as disk format data, to the host computer 50. Accordingly, when data to be processed by the application 44 is transferred by the SCSI disk 42, the performances of the SCSI bus adapter 48, of the host computer 50, and of the host bus 52 do not affect the rate of transfer of this data from the SCSI disk 42 to the application 44.

If the only functions required of the SCSI bus adapter 48, the host computer 50, and the host bus 52 are to send a fetch command to the SCSI disk 42 for each data fetch and to initialize the SCSI disk 42 at power on, the SCSI bus adapter 48, the host computer 50, and the host bus 52 may be implemented using low cost products. However, because the application 44 receives data from the SCSI disk 42 directly, the rate of data transfer can be faster than is known with low cost data servers.

With the arrangement shown in FIG. 2, control of the SCSI bus 46 is switched between the SCSI bus adapter 48 and the application 44 so that the host computer 50 and the SCSI bus adapter 48 initiate data fetches and so that the application 44 controls the rate of data transfer. Thus, at power on, the SCSI disk 42 is initialized by the host computer 50 and the SCSI bus adapter 48. After power on, the host computer 50 reads file parameter information on the SCSI disk 42, and sends a data fetch command to the SCSI disk 42. Up to this point, the SCSI bus adapter 48 and the host computer 50 have control of the SCSI bus 46. When the SCSI disk 42 starts to transfer data to the SCSI bus 46, the application 44 takes over control of the SCSI bus 46 and receives the data directly. Also, the application 44 controls the rate at which data is transferred from the SCSI disk 42 to the application 44.

When the SCSI disk 42 completes the current data fetch command, control of the SCSI bus 46 is passed back to the SCSI bus adapter 48 in order to allow the host computer 50 to send the next data fetch command. By switching control of the SCSI bus 46 between itself and the SCSI bus adapter 48, the application 44 is able to directly control the SCSI disk 42 during data transfer. The direct control of data transfer allows the application 44 to control the data rate.

Figure 3:
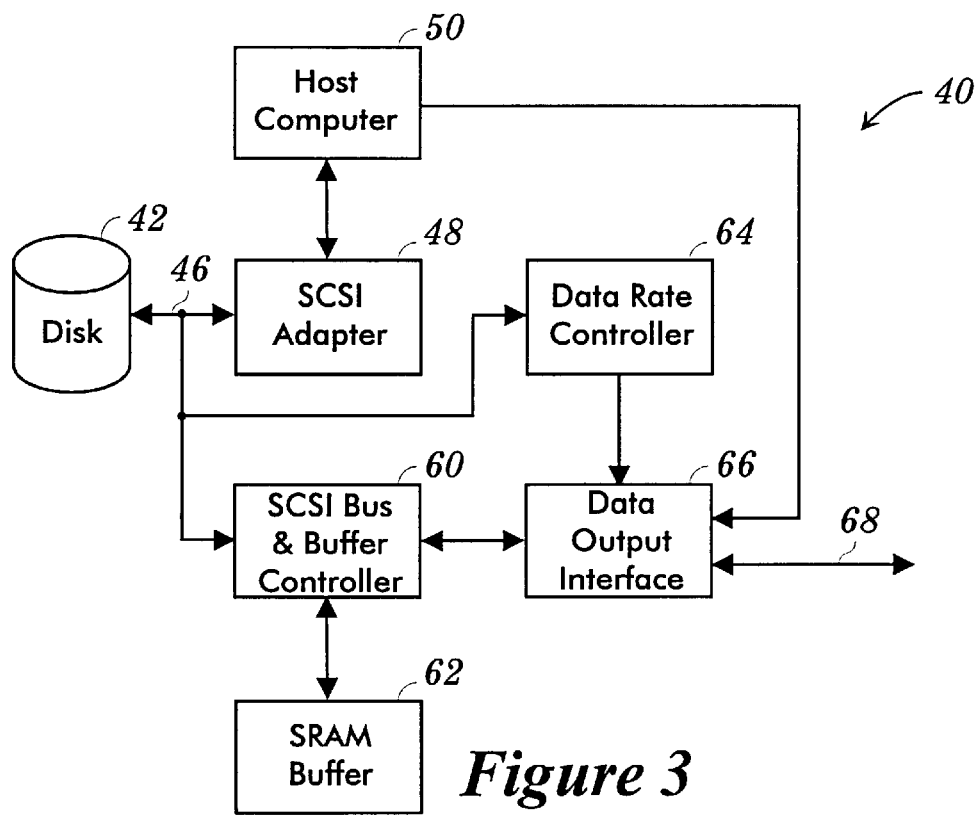
FIG. 3 illustrates the data server of FIG. 2 in additional detail, wherein the data server illustrated in FIG. 3 includes an SCSI bus and buffer controller, a data rate controller, and a data output interface.

The application 44 is shown in additional detail in FIG. 3. The application 44 includes an SCSI bus and buffer controller 60, an SRAM buffer 62, a data rate controller 64, a data output interface 66, and an application data bus 68. The SRAM buffer 62 operates as a buffer between the SCSI disk 42 and the application data bus 68. The application data bus 68 supplies the data stored on the SCSI disk 42 to further downstream processing by the application 44 in response to data requests from the downstream processing. For example, in a video application, the SCSI disk 42 may store compressed video data from an MPEG-2 data compressor. The compressed video data may then be supplied over the application data bus 68 to a VSB modulator in response to data requests from the VSB modulator, and the VSB modulator modulates the compressed video data that it receives for subsequent transmission to a video user.

As is discussed below, the SCSI bus and buffer controller 60 switches control of the SCSI bus 46 between the SCSI bus adapter 48 and the application 44. The data rate controller 64 has two functions. The first function is to control the average data transfer rate from the SCSI disk 42 at any given data rate within a wide range of data rates. The second function is to smooth the bursty data stream from the SCSI disk 42 and to output a data stream to the application data bus 68 so that the data stream has a jitter character which is acceptable to the processing further downstream. The data transfer rate is accomplished through the use packet tokens generated by the data rate controller 64. These packet tokens are generated according to the given data rate, and are distributed along a time line as uniformly as possible to guarantee small jitters at any given time.

Figure 4:
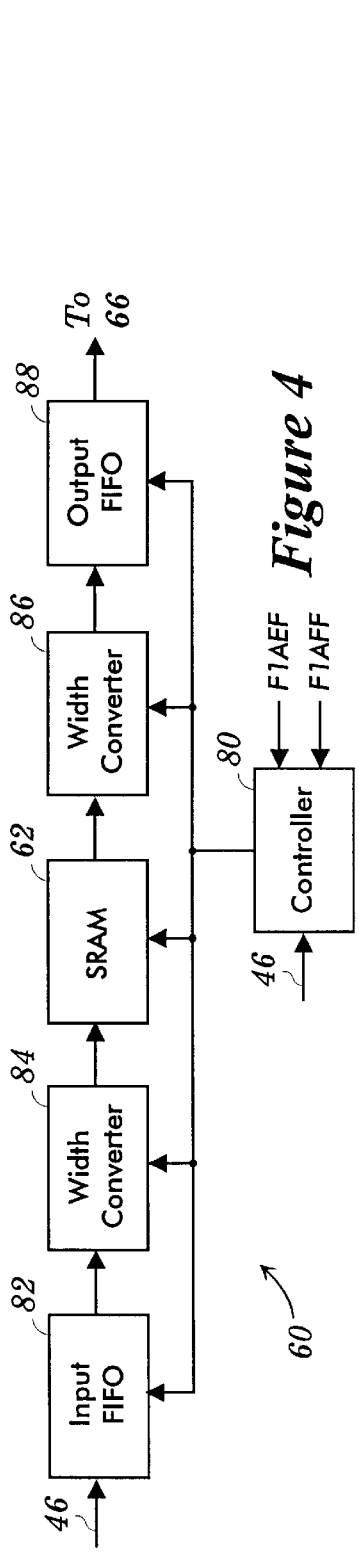
FIG. 4 illustrates the SCSI bus and buffer controller of FIG. 3 in additional detail.

As shown in FIG. 4, the SCSI bus and buffer controller 60 includes a buffer controller 80, and input FIFO memory 82, an input width converter 84, an output width converter 86, and an output FIFO memory 88. The SRAM buffer 62 may comprise, for example, two 128K×8 static random access memories. The input FIFO memory 82 may be a 512 byte FIFO memory. Similarly, the output FIFO memory 88 may be a 512 byte FIFO memory.

The input FIFO memory 82 gets data from the SCSI bus 46, and supplies that data through the input width converter 84 to the SRAM 62. The input and output width converters 84 and 86 are necessary to create a timing division between the reading and writing processing of the SRAM 62. In that way, the system in FIG. 4 operates like a large FIFO allowing reading and writing to be done at the same time without doubling the internal clock frequency.

The input FIFO memory 82, the input width converter 84, the SRAM buffer 62, the output width converter 86, and the output FIFO memory 88 are controlled by the buffer controller 80 which basically clocks data through the input FIFO memory 82, the input width converter 84, the SRAM buffer 62, the output width converter 86, the output FIFO memory 88, and out to the data output interface 66. The SRAM buffer 62, and the input and output FIFO memories 82 and 88, are used to decouple the difference in clock rates between the clock rate used by the SCSI disk 42 and the clock rate used downstream of the application data bus 68.

The packet tokens generated by the data rate controller 64 control the reading of data from the output FIFO memory 88. The buffer controller 80 monitors the status of the input FIFO memory 82, the SRAM buffer 62, and output FIFO memory 88. In that way, the status of the input FIFO memory 82 is related to the output FIFO memory 88. The input FIFO memory 82 indicates whether it is almost empty by providing a low signal on an almost empty line F1AEF or almost full by providing a low signal on an almost full line F1AFF. A low signal on the almost empty line F1AEF indicates that the input FIFO memory 82 is almost empty. A low signal on the almost full line F1AFF indicates that the input FIFO memory 82 is almost full. Thus, the signals on the almost empty and almost full lines F1AEF and F1AFF reflect the status of the data rate control, and are used to control the SCSI disk 42 when the SCSI disk 42 is sending out data, with a low signal on the almost full line F1AFF stopping data flow and a low signal on the almost empty line F1AEF restarting data flow. The level of unprocessed data stored in the input FIFO memory 82 which triggers the low signals on the almost empty and almost full lines F1AEF and F1AFF is a matter of design choice.

Figure 5:
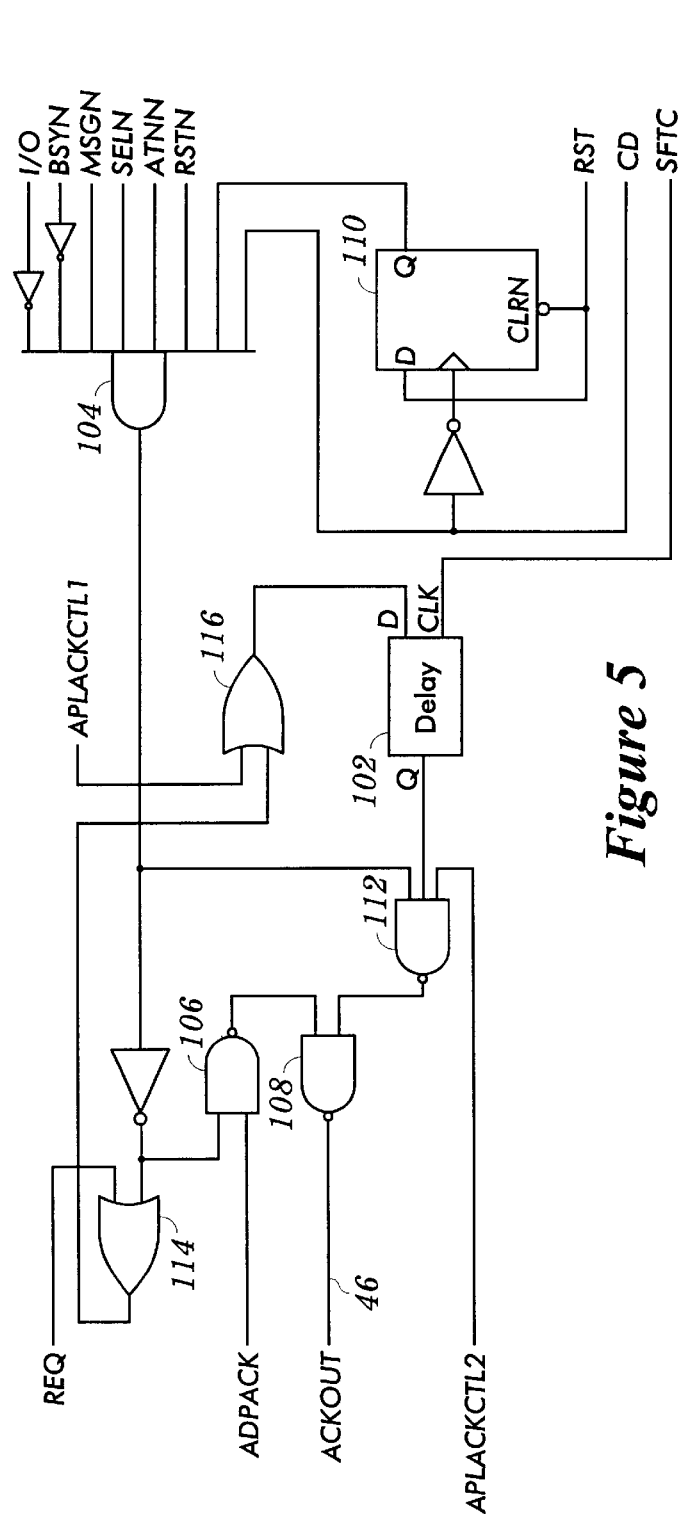
FIG. 5 illustrates a switching portion of the data rate controller of FIG. 3.

As discussed above, control of the SCSI bus 46 is switched between the SCSI bus adapter 48 and the application 44. A switching portion 100 of the buffer controller 80, which is suitable for switching control of the SCSI bus 46 between the SCSI bus adapter 48 and the application 44, is illustrated in FIG. 5. The switching portion 100 also allows the application 44 to repeatedly start and stop data flow from the SCSI disk 42 so that the output data stream from the SCSI disk 42 over the SCSI bus 46 is maintained at a given data rate established by the rate at which the data is taken from the SRAM buffer 623 for further processing downstream of the data output interface 66.

According to the SCSI protocol, communication over the SCSI bus 46 is controlled by the SCSI protocol signals REQ and ACK during the data in phase of the SCSI bus 46. During this data in phase, the SCSI disk 42 sends a REQ pulse with each type of data it transmits over the SCSI bus 46. The SCSI disk 42 expects to get back an ACK pulse for each REQ pulse that it transmits. The ACK pulse is an acknowledgment of the success of a corresponding data byte transfer. The SCSI disk 42 operates such that it does not wait to transmit a subsequent data byte and corresponding REQ pulse upon receipt of an ACK pulse. However, the SCSI disk 42 does track the ACK pulses that it receives. If the accumulated number of the REQ pulses that it sends out exceeds the accumulated number of ACK pulses that it receives by the SCSI offset, then the SCSI disk 42 stops sending out data and corresponding REQ pulses until it receives back a predetermined number of ACK pulses.

The switching portion 100 utilizes this REQ and ACK bus control feature of the SCSI protocol by switching the source of ACK pulses between the SCSI bus adapter 48 and the application 44 so that the SCSI bus adapter 48 and the host computer 50 are allowed to initiate data transfer and so that the application 44 is allowed to control the rate at which data is transferred from the SCSI disk 42.

Inputs I/ON, BRYN, MSG., SEAN, ANN, RSTN, and CDN (shown in FIG. 5) are all SCSI bus control signals. The signal SFTCLK is an external clock which has a predetermined frequency and which is used to clock a delay circuit 102. An AND gate 104, in response to operation of a D flip-flop 110, which in turn is responsive to signal on an input RST, and to the SCSI bus control signals, selects whether the source of ACK pulses is the SCSI bus adapter 48 or the application 44. When the signal on the input RST is low, or when the SCSI bus status is not in the "data in" phase, the source of ACK pulses is the SCSI bus adapter 48. When the signal on the input RST is high, and when the SCSI bus status is in the "data in" phase, the source of ACK pulses is the application 44.

During initialization, RST is kept low. The most time consuming part of initialization is the loading of the parameters into the latches of a packet token generator 400, which is described blow. As the start of parameter loading, the host computer 50 issues an SCSI read command in order to read the parameter file over the SCSI bus 46. When the data in the parameter file are read over the SCSI bus 46, the data rate controller 64 directly takes the data from the SCSI bus 46. At the beginning of the parameter file, there are one or more key words, which is followed by the data rate control parameters. When the data rate controller 64 takes in the data of the parameter film, the key words start a parameter loading state machine 600, described below, allowing the data rate control parameters to be loaded into corresponding latches. During this procedure, the SCSI bus 46 is controlled by the SCSI bus adapter 48 because RST is still low. After parameter loading, initialization is finished. Then, the parameter loading state machine 600 resets RST to high, preparing for the rate controlled data transfer. After the SCSI read command is sent over the SCSI bus 46 to the SCSI disk 42, the SCSI bus phase changes to the data in phase, and the SCSI control signal CDN goes low, which clocks the high RST to the input of the AND gate 104 at the same time so that control of the SCSI bus 46 is switched to the application 44.

While the output of the AND gate 104 is high, a NAND gate 112 is conditioned to permit application ACK pulses (ADPACK) from a NAND gate 106 to pass through a NAND gate 108 to the ACKOUT line of the SCSI bus 46. Application ACK pulses are essentially echoes of the REQ pulses. That is, when an REQ pulse is received by the switching portion 100, the REQ pulse is connected through an OR gate 114, through the OR gate 116 under control of an APLACKCTL1 control signal (see FIG. 6), and to the D input of the delay circuit 102. The delay circuit 102 delays each REQ pulse by 6 REQ pulse times. The delayed REQ pulse is connected through the NAND gate 112 under control of an APLACK-CTL2 control signal (see FIG. 6) and through the NAND gate 108 to the ACKOUT line of the SCSI bus 46. Accordingly, these REQ pulses are first gated by the APLACKCTL1 control signal, are delayed six REQ pulse times by the delay circuit 102, and are then gated by the APLACKCTL2 control signal in order to generate the application ACK pulses.

Figure 6:
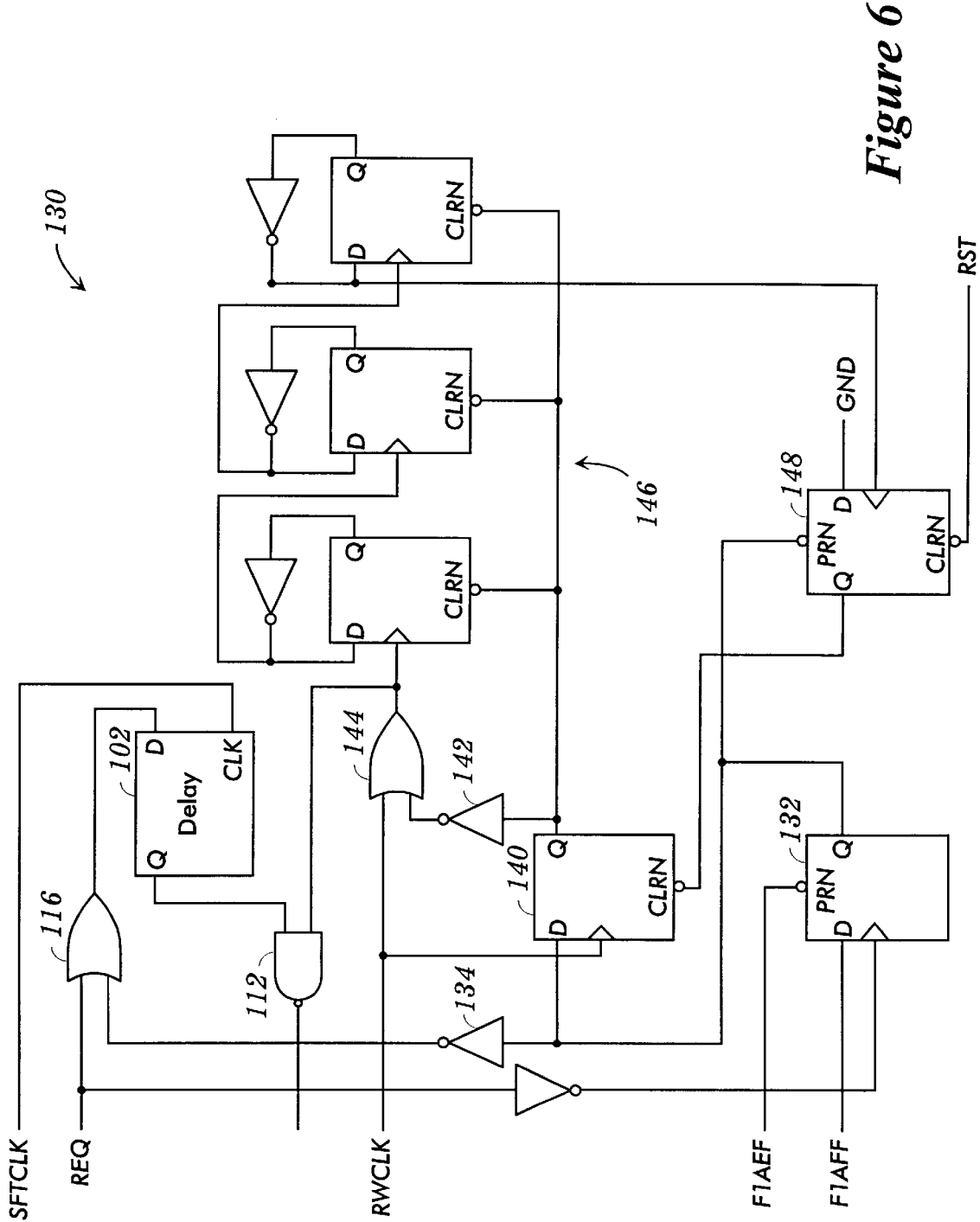
FIG. 6 illustrates an SCSI bus controlling portion of the data rate controller of FIG. 3.

In addition to the switching portion 100, an SCSI bus controlling portion 130, which is illustrated in FIG. 6, is also part of the buffer controller 80. The purpose of the SCSI bus controlling portion 130 is to allow the application 44, through the low signal on the almost empty line F1AEF and the low signal on the almost full line F1AFF, to repeatedly start and stop data flow from the SCSI disk 42 so that the average rate at which data is supplied from the SCSI disk 42 to the SRAM buffer 62 is equal to the required data transfer rate. To this end, the SCSI bus controlling portion 130 receives the signal on the almost empty line F1AEF and the signal on the almost full line F1AFF from the input FIFO memory 82 shown in FIG. 4.

Figure 7:
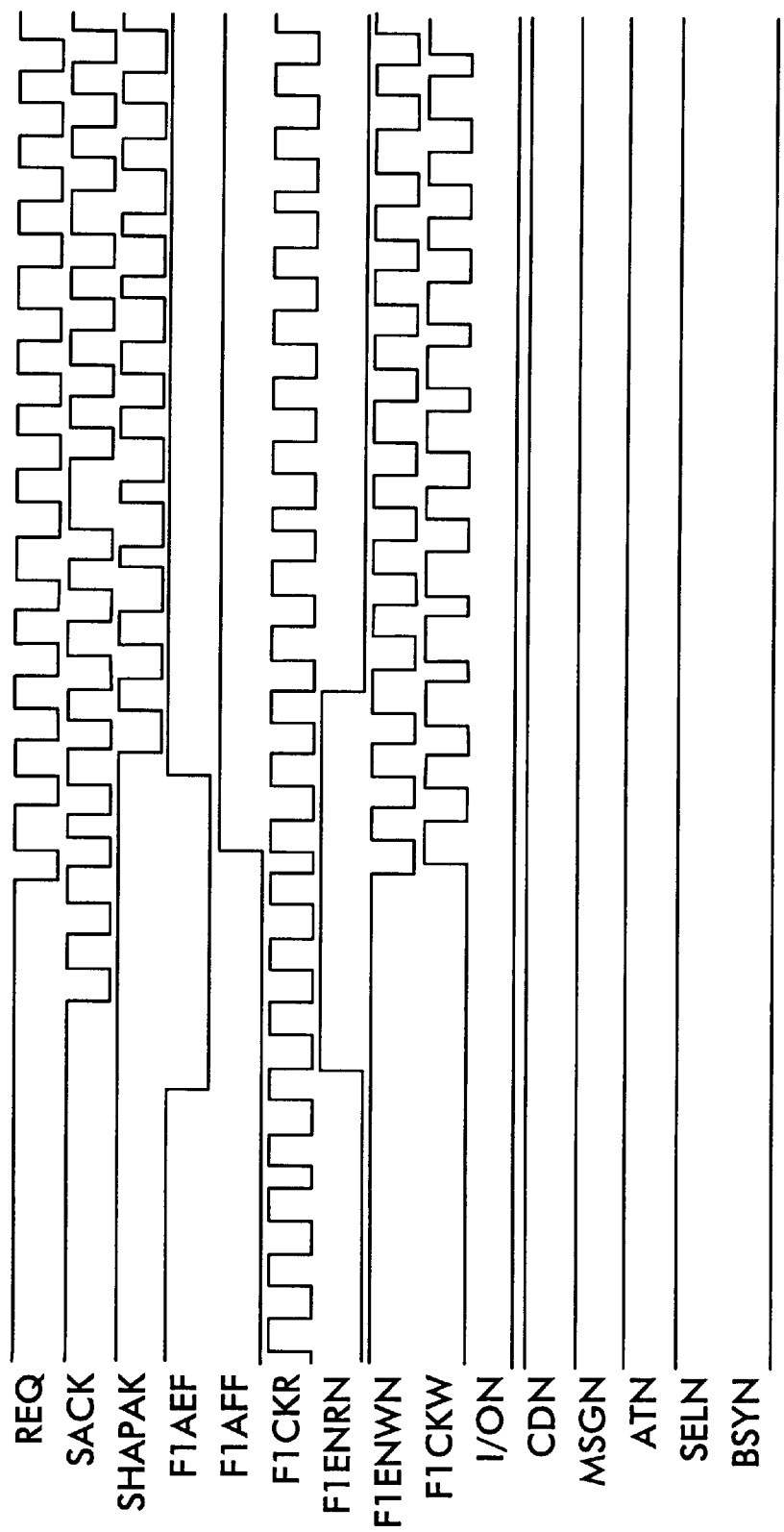
FIG. 7 illustrates a timing chart applicable to the data rate controller.

When the input FIFO memory 82 is neither almost empty nor almost full, the signals on the almost empty and almost full lines F1AEF and F1AFF are high as shown in FIG. 7. Accordingly, a D flip-flop 132 provides a high output on its Q terminal. This high output is inverted by an invertor 134 to a low state which permits REQ pulses to pass through the OR gate 116 to the D terminal of the delay circuit 102. These REQ pulses are delayed six REQ pulse times by the delay circuit 102, and are then supplied through the NAND gate 111. As discussed above, the SCSI disk 42 receives these application ACK pulses and thus continues to transmit data together with REQ pulses. During this period, data continuously moves through the input FIFO memory 82, the SRAM buffer 62, and the output FIFO memory 88, and is processed downstream of the data output interface 66.

If the input FIFO memory 82 fills with data from the SCSI disk 42 to the point where it is almost full, the signal on the almost full line F1AFF goes low which is clocked through to the Q terminal of the D flip-flop 132 upon receipt of the next REQ pulse. The low output on the Q terminal of the D flip-flop 132 is inverted to a high level by the invertor 134 and is supplied to the OR gate 116 cutting off the flow of REQ pulses to the delay circuit 102. Also, the low on the Q output of the D flip-flop 132 is clocked through a D flip-flop 140, is inverted by an invertor 142, and passes through an OR gate 144 as a high level signal. Moreover, the low on the Q output of the D flip-flop 132 clears a counter 146. The counter is a three bit counter that counts to eight in accordance with the SCSI offset of eight.

The high signal at the D input of the delay circuit 102 and the six REQ pulses stored in the delay circuit 102 are clocked through the delay circuit 102 so that the six REQ pulses stored in the delay circuit 102 are passed through the NAND gate 112. After these six REQ pulses pass through the NAND gate 112 so that the high state at the output of the OR gate 116 fills the delay circuit 102, the NAND gate 112 has high signals on both of its inputs which shuts down the supply of application ACK pulses to the ACKOUT line of the SCSI bus 46 through the NAND gate 108. After the application ACK pulses are stopped, the SCSI disk 42 continues to transmit data and corresponding REQ pulses until the SCSI offset of eight is reached. Thereafter, the SCSI disk 42 ceases the supply of data and corresponding REQ pulses. However, data continuously moves from the input FIFO memory 82, through the SRAM buffer 62, and through the output FIFO memory 88, and is processed downstream of the data output interface 66.

When the signal on the almost empty line F1AEF goes low, the D flip-flop 132 is preset so that its Q output goes high. A high on the Q output from the D flip-flop 132 is inverted by the invertor 134 in order to condition the OR gate 116 to pass REQ pulses to the delay circuit 102. However, these REQ pulses are not yet present at the SCSI bus controlling portion 130 because the SCSI disk 42 has not received the ACK pulses to reduce the difference between the accumulated number of REQ pulses and the accumulated number of ACK pulses to a point where the SCSI disk 42 can begin sending out data. The SCSI bus controlling portion 130 must supply these ACK pulses.

Accordingly, the high on the output of D flip-flop 132 is also clocked through the D flip-flop 140, is inverted by the invertor 142, and conditions the OR gate 144 to pass read/write clock pulses to the NAND gate 112 and to the counter 146. The read/write clock (RWCLK) has about the same frequency as REQ. The read/write pulses are passed through the NAND gate 112 and the NAND gate 108 as application ACK pulses to the ACKOUT line of the SCSI but 46. The eight bit counter 146 counts eight read/write clock pulses and then clocks a D flip-flop 148 to clear the D flip-flop 140. Clearing of the D flip-flop 140 clears the eight bit counter 146, and conditions the OR gate 144 to cut off the supply of read/write clock pulses to the NAND gate 112. Thus, read/write pulses are no longer supplied to the ACKOUT line of the SCSI bus 46 as application ACK pulses. However, eight application ACK pulses have been supplied to the SCSI disk 42 in order to start the data transfer from the SCSI disk 42. The delayed REQ pulses coming out of the delay 102 follow right after those eight read/write clock pulses, and are sent back to the SCSI disk 42 as ACK pulses. Accordingly, the count of the accumulated REQ pulses and the accumulated ACK pulses will always be the same at restart of data transmission by the SCSI disk 42. Clearing of the D flip-flop 140 also conditions the NAND gate 112 to begin supplying REQ pulses to the ACKOUT line of the SCSI bus 46 from the delay circuit 102 in order to continue data transmission by the SCSI disk 42.

As can be seen by comparing FIGS. 5 and 6, the delay circuit 102, the NAND gate 112, and the OR gate 116 are shown in both the switching portion 110 and the SCSI bus controlling portion 130 for ease of understanding. It should be understood, however, that each of these elements is used only once in the data rate controller 64, that the NAND gate 112 has the inputs connected to it as shown in FIG. 5 as well as the inputs connected to it as shown in FIG. 6, and that the OR gate 116 has the inputs connected to it as shown in FIG. 5 as well as the inputs connected to it as shown in FIG. 6.

Figure 8:
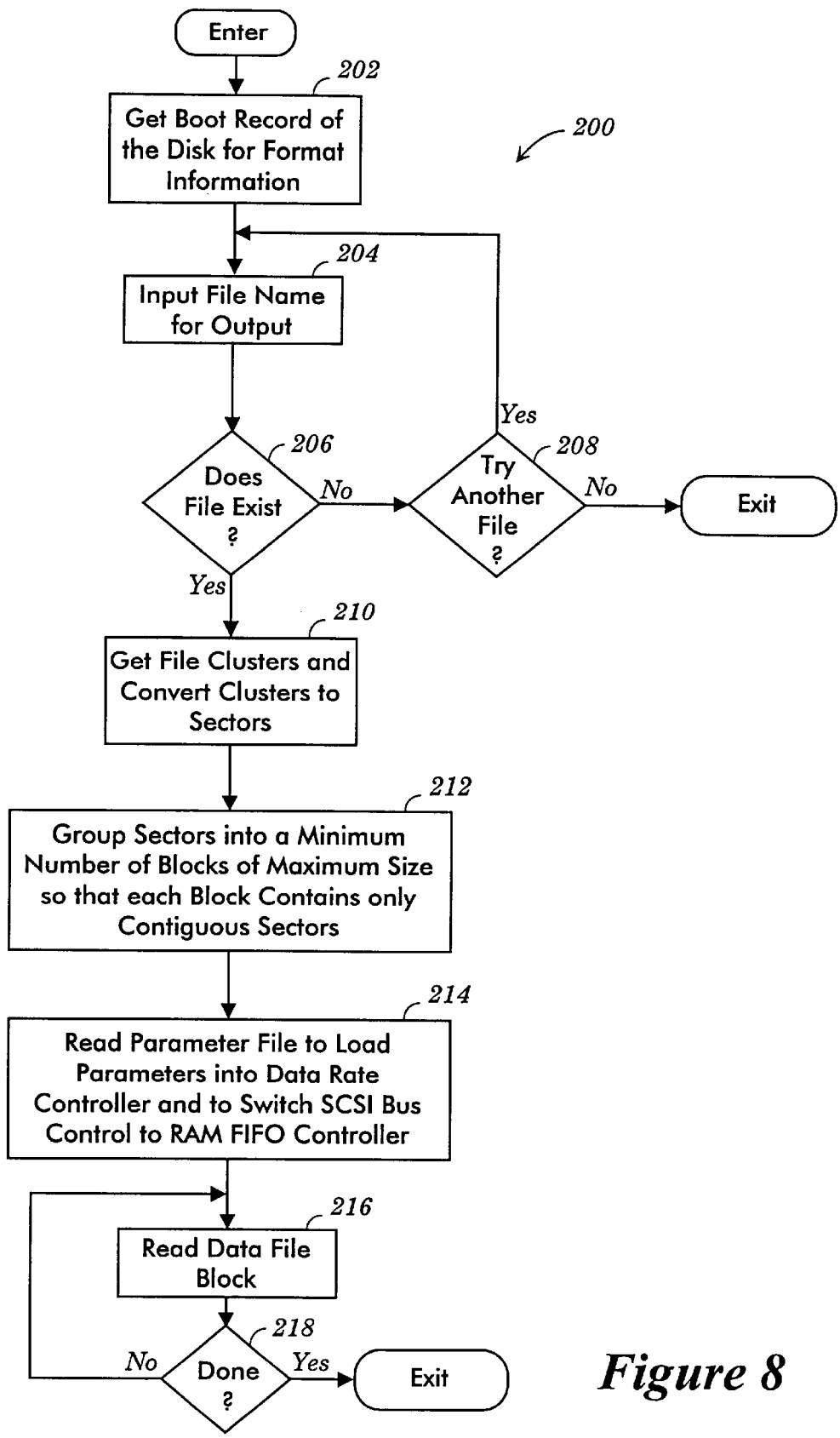
FIG. 8 illustrates a program which is executed by the host computer of FIG. 2 to initiate data transfer.

In order to control the initiation of data flow from the SCSI disk 42 to the application 44, the host computer 50 executes a program 200 shown in FIG. 8. At a block 202, the host computer 50 fetches the boot record from the SCSI disk 42 in order to determine how the hard disk 42 is formatted. At a block 204, the host computer 50 sends to the SCSI disk 42 the name of a file that is desired for processing by the application 44. At a block 206, the host computer 50 determines whether that file exists. If the file does not exist, the host computer 50 determines, at a block 208, whether the application 44 desires another file. If not, the host computer 50 exits the program 200. If the application 44 desires another file, program flow returns to the block 204.

If a file does exist as determined at the block 206, then the host computer 50 at a block 210 finds the file location and converts file clusters to sectors based upon the format information received at the block 202. (The SCSI disk 42 stores files in clusters. Moreover, the number of sectors in one cluster may vary depending on the capacity of the SCSI disk.) The host computer 50 at a block 212 groups the sectors into a minimum number of blocks of maximum size (e.g., 16 Mbytes) so that each block contains only contiguous sectors of the named file.

At a block 214, the host computer 50 reads the parameter file associated with the named data file in order to load parameters into the packet token generator 400 of the data rate controller 64. These parameters determine the rate at which data is transferred from the SCSI disk 42 to the processing downstream of the data output interface 66.

As will be clear from the discussion below, the SCSI disk 42 transfers data at a first rate, and that data is processed by the application 44 downstream of the data output interface 66 at a second rate. The SRAM buffer 62 buffers the data between the SCSI disk 42 and the processing downstream of the data output interface 66. The SRAM buffer 62 is operated at a slower speed than the speed of the downstream processing in order to ensure that the downstream processing is not overloaded by data from the SCSI disk 42. In order to accommodate the difference between the rate at which data is requested by the processing downstream of the data output interface 66 and the rate at which data is transferred by the SCSI disk 42, null data packets may be occasionally inserted into the output data stream on the application data bus 68 to make up for this difference.

After the host computer 50 reads the parameter file at the block 214, the host computer 50 at a block 216 instructs the SCSI disk 42 to send a block of data out over the SCSI bus 46 and at the same time instructs the SCSI bus adapter 48 to disregard the data. Then the switching portion 100 switches control of the SCSI bus 46 from the SCSI bus adapter 48 to the application 48. The block of data is transferred under control of the application ACK pulses as described above. After a first block of data is read by the application 44, and assuming that there are more blocks of data in the data file so that reading is not done as determined at a block 218, control of the SCSI bus 46 is switched back to the SCSI bus adapter 48. Then the host computer 50 instructs the SCSI disk 42 to send another block of data. When all of the blocks of data have been read by the application 44 as determined by the host computer 50 at a block 218, the program 200 exits.

Alternatively, instead of exiting at the block 218, program flow might return to the block 214 to repetitively instruct the SCSI disk 42 to resend the data. This operation may be desirable during testing or during video on demand, for example.

The processing downstream of the data output interface 66 issues data requests in order to request data to be supplied from the SRAM buffer 62 over the application data bus 68. These data requests may be in the form of DREQ pulses which are received over the application data bus 68. Each DREQ pulse corresponds to one packet of data. A data packet may contain, for example, 188 bytes of data with eight bits in each byte. The rate of the DREQ pulses received over the application data bus 68 may be fixed. For example, in the case of a 16 VSB modulator operating as the downstream processing at a frequency of 38.76 MHz, the DREQ pulses must occur at a rate of 38.76/(188×8) MHz.

However, the data server 40 delivers data from the SCSI disk 42 at a rate which is typically lower than the DREQ pulse rate because otherwise the processing downstream of the data output interface 66 may over drive the data server 40. Because the rate at which data is delivered by the data server 400 is lower than the DREQ pulse rate, the difference between the rate at which the data server 40 delivers data and the DREQ pulse rate is compensated by delivering null packets over the application data bus 68 in order to accommodate the difference.

This compensation can be implemented by providing the packet token generator 400 which generates packet tokens. The packet token generator 400 is discussed below in additional detail. The pulse rate of the packet tokens produced by the packet token generator 400 is lower than the DREQ pulse rate. The data output interface 66 receives and stores the packet tokens produced by the packet token generator 400. When a DREQ pulse arrives, the data output interface 66 determines whether there is a packet token in its storage. If there is, a data packet from the SCSI disk 42 is read from the output FIFO memory 88 and is delivered over the application data bus 68 and then the packet token is deleted from the storage of the data output interface 66. On the other hand, if there is no packet token in the storage of the data output interface 66, the data server 40 instead sends a null packet downstream over the application data bus 68. A null packet, for example, may consist of a packet head 0×47 that is followed by 0×1F, 0×FF, and 0×10. After that, the rest of the packet should be all 0×FF. However, all of the null packet may alternatively consist of 0×10 or 0×00.

The rate of the packet tokens controls the transfer rate of the data files from the SCSI disk 42. The distribution of the packet tokens along a time line controls the jitter of the output data stream. The following describes a model for packet token generation. By changing the structure of the model, the rate and the distribution of the packet tokens can be adjusted to satisfy the requirement of the downstream application. The model described below is directed to an MPEG-2 transport stream decoder as the downstream application.

The packet token generator may have an internal clock which operates at a reference frequency $f_r$, and the data server 40 may delivery data at a rate of $f_0$ bits per second. Usually, $f_r$ is a fixed frequency, and $f_0$ may vary according to the data file to be transferred. Ideally, the number of packet tokens $f_t$ which should be generated per second is determined by dividing the data delivery rate $f_0$ by the size of a data packet. For example, if the packet size is 188 bytes with eight bits per byte, the $f_t$ is given by the following equation:

$$f_t = \frac{f}{(188)(8)}. \tag{1}$$

Ideally, the relationship between $f_0$ and $f_r$ should be given by the following equation:

$$f_r = \frac{k f_0}{(188)(8)} \tag{2}$$

where $k \geq 1$ is an integer. Equation (2) means that a packet token is generated every k reference clocks of $f_r$, and that there should be $f_0$ packet tokens in a period of the 188×8×$f_r$ reference clocks. However, these relationships depend upon the values for $f_r$ and $f_0$. In the general case, the values selected for $f_r$ and $f_0$ will not satisfy equation (2). Therefore, equation (2) may be generalized to the following equation:

$$\alpha f_0 + \beta (188)(8) f_r \tag{3}$$

where $f_0$ is the data rate in bits per second of the data server 40, $f_r$ is the rate of the reference clock of the packet token generator 400, and the integers α and β are determined as described below.

Equation (3) is a way of relating packet tokens to both the data rate frequency $f_0$ and the packet token generator reference clock frequency $f_r$ in order to generate packet tokens that can be separated by whole numbers of cycles of the packet token generator reference clock. According to equation (3), packet tokens are generated throughout the period of 188×8×$f_r$ reference clocks. Among these packet tokens, β packet tokens are generated at each (α+1) reference clocks, and ($f_0$−β) packet tokens are generated at each α reference clocks.

The value of α can be determined according to the following equation:

$$\frac{(188)(8)(f_r)}{f_0} \qquad (4)$$

where α is the whole number result of equation (4) (i.e., the remainder is discarded). For example, if the reference clock has a frequency $f_r$ of 19,604 Hz, if the data rate frequency $f_0$ is 24,064 Hz, and if each data packet includes 188 bytes with eight bits per byte, α is 1225 (and the remainder 0.25 is discarded).

After α has been determined as described above, β is determined from equation (3). Based upon the above example where $f_r$ is 19.604 Hz, where $f_0$ is 24,064, and where a data packet comprises a 188 bytes with eight bits per bit, β is 6,016. Two quantities $k_1$ and $k_2$ may be defined according to the following equations:

$$k_1 = f_0 - \beta \qquad (5)$$

$$k_2 = \beta \qquad (6)$$

If the packet tokens that are generated every α cycles are referred to as A packet tokens, and if the packet tokens that are generated every (α+1) cycles are referred to as B packet tokens, then $k_1$ is the number of A packet tokens and $k_2$ is the number B packet tokens that are generated by the packet token generator every $(188)(8)f_r$ clocks in order to obtain the required output data rate $f_0$. In other words, the number of A and B packet tokens that should preferably be generated by the packet token generator during $(188)(8)f_r$ clocks is given by the following expression:

A: $k_1$ (7)

B: $k_2$

Figure 9:
FIG. 9 illustrates one possible distribution of packet tokens generated by a packet token generator of the data rate controller of FIG. 3.

Accordingly, the packet token generator 400 generates $k_1$ A packet tokens followed by $k_2$ B packet tokens followed by $k_1$ A packet tokens followed by $k_2$ B packet tokens and so on. FIG. 9 shows the packet token stream where $k_1$ A packet tokens followed by $k_2$ B packet token are generated. (In the above example, $k_1$ is 18,048 and $k_2$ is 6,016.)

The ratio $k_2/k_1$ represents the ratio of B packet tokens to A packet tokens. With such a ratio, the accumulated jitter over the period defined by $(188)(8)f_r$ will be substantially zero, and the data rate achieved will be the required data rate $f_0$. However, because the values of $k_1$ and $k_2$ are usually very large, the instantaneous jitter (i.e., the jitter at any given point in time) may be large. That is, if all of the $k_1$ A packet tokens are generated during a first period of time and all of the $k_2$ B packet tokens are generated during a second period of time, the jitter will accumulate during the first period and will reach the maximum at the end of the first period. The accumulated jitter will decrease during the second period and will be zero at the end of the second period.

A solution to reducing instantaneous data rate jitter is to intermix the A packet tokens and the B packet tokens so that the accumulated data rate jitter over any period of time will be small. One possible way of mixing A packet tokens and B packet tokens is described as follows. In Equation (7), let it be assumed that k1 is larger than k2. Then $p_1$ ($p_1 \geq 1$) A tokens can be combined with one B token to create a super packet token comprising $p_1$ A packet tokens and one B packet token. These super packet tokens can be interspersed with the left over A packet tokens so that the packet token generator first generates $k_2$ super packet tokens followed by $k_3$ A packet tokens, where k3 is the number of the left over A tokens. In other words, the number of super packet tokens and A packet tokens that should preferably be generated by the packet token generator during $(188)(8)f_r$ clocks is given by the following expression:

$$p_1 \cdot A + B: k_2 \qquad (8)$$

A: $k_3$ where $k_3$ is given by the following equation:

$$k_3 = k_1 - p_1 \cdot k_2 \qquad (9)$$

and where $p_1$ is an integer satisfying the following expression:

$$p_1 \cdot k_2 \leq k_1 \leq (p_1+1) \cdot k_2 \qquad (10)$$

Figure 10:
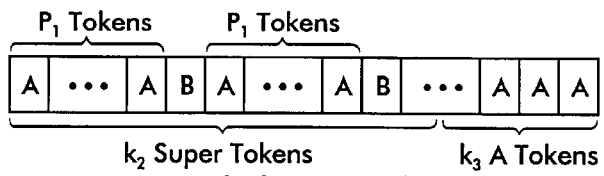
FIG. 10 illustrates another possible distribution of packet tokens generated by a packet token generator of the data rate controller of FIG. 3.

Accordingly, the packet token generator generates $k_2$ superpacket tokens (wherein each superpacket token including $p_1$ A packet tokens followed by one B packet token) followed by $k_3$ A packet tokens followed by $k_2$ superpacket tokens followed by $k_3$ A packet tokens and so on. The data rate achieved is still $f_0$ because the ratio of B packet tokens to A packet tokens is still $k_2/k_1$. FIG. 10 shows the packet token stream where $k_2$ superpacket tokens followed by $k_3$ A packet tokens are generated.

The accumulated data rate jitter during the time that $k_2$ superpacket tokens are generated is smaller than the accumulated data rate jitter during the time that either $k_1$ A packet tokens or $k_2$ B packet tokens are generated in accordance with expression (7). Similarly, the accumulated data rate jitter during the time of $k_3$ A packet tokens is smaller than the accumulated data rate jitter during the time that either $k_1$ A packet tokens or $k_2$ B packet tokens are generated in accordance with expression (7). To further reduce the accumulated data rate jitter, the operation indicated by expression (8) above can be repeated according to the following conditions:

$$0 \leq k_i < k_{i-1} \text{ and } p_i \geq 1 \text{ for } i > 1 \qquad (11)$$

Because the following conditions are also true $$k_i + k_{i-1} \leq k_{i-2} \text{ and } 2k_i \leq k_{i-2} \text{ for } i > 2 \qquad (12)$$

the procedure of repeating the operation given by expression (8) always converges.

As discussed above, the values for $k_1$ and $k_2$ are usually very large. Hence, the final values of $k_i$ and $p_i$ obtained from the procedure described above will usually be large. Accordingly, a hardware implementation of a packet token generator according to the procedure of repeating expression (8) may predictably result in complicated hardware. One way of reducing the complexity of a hardware implementation of this procedure is to use a pair of smaller integers $m_1$ and $m_2$ in a ratio of $m_2/m_1$ to approximate the ratio $k_2/k_1$. The particular values of the integers $m_1$ and $m_2$ are chosen according to the desired data rate jitter tolerance.

When the ratio of B packet tokens to A packet tokens is $k_2/k_1$, and the reference clock frequency is $f_r$, the corresponding data rate $f_0$ can be expressed according to the following equation:

$$f = \frac{\left(1 + \frac{k_2}{k_1}\right)(188)(8)(f_r)}{1 + \alpha\left(1 + \frac{k_2}{k_1}\right)} \quad (13)$$

where $\alpha$ is defined in equation (3). If it is assumed that the ratio $k_2/k_1$ is approximated by the ratio $m_2/m_1$, then the following equation results:

$$\frac{m_2}{m_1} = \frac{k_2}{k_1} \pm \quad (14)$$

Then, with the ratio of B packet tokens to A packet tokens being approximately $m_2/m_1$ and the reference clock frequency being $f_r$, the corresponding data rate $f_0^*$ is given by the following equation:

$$f_0^* = \frac{\left(1 \pm \delta + \frac{k_2}{k_1}\right)(188)(8)(f_r)}{1 + \alpha\left(1 \pm \delta + \frac{k_2}{k_1}\right)} \quad (15)$$

If the data rate jitter is defined by the following expression:

$$\frac{f_0^* - f}{f} \quad (16)$$

then the following equation may be derived from equations (13) and (15) and gives the relationship between the data rate jitter and the approximation error of $k_2/k_1$;

$$\frac{f_0^* - f_0}{f_0} \approx \frac{\delta}{\alpha\left(1 + \frac{m_2}{m_1}\right)} \quad (17)$$

In the case where the data server 40 is used to supply MPEG-2 data, $f_r$ may be selected at 10.762237 MHZ and the upper bound of the data rate $f_0$ may be selected at 38.76 Mbits per second. Under these conditions, the lower bound of $\alpha$ is 416. If the data rate jitter caused by the approximation of $k_2/k_1$ is determined to be 5 ppm, then $\delta$ is about 1/500. This accuracy can be achieved by choosing $m_1=255$. With $m_1=255$, and with $k_2/k_1<1$, $m_2$ can be determined by the following equation:

$$m = \begin{cases} \lfloor 255(k_2/k_1) \rfloor; & \text{when } 255(k_2/k_1) - \lfloor 255(k_2/k_1) \rfloor < 0.5 \\ \lceil 255(k_2/k_1) \rceil; & \text{when } 255(k_2/k_1) - \lfloor 255(k_2/k_1) \rfloor \geq 0.5 \end{cases} \quad (18)$$

If it is assumed that $k_2<k_1$, then $m_2<m_1$ and the following equation results from equation (18);

$$\left|\frac{k_2}{k_1} - \frac{m_2}{m_1}\right| = \left|\frac{255\left(\frac{k_2}{k_1}\right)}{255} - \frac{m_2}{255}\right| \leq \frac{1}{500} \quad (19)$$

When $m_1$ and $m_2$ are chosen according to the above equations, they are usually much smaller than $k_1$ and $k_2$, and the resulting hardware implementation is largely simplified.

Alternatively, the value of $m_1$ may first by chosen so that the complexity of the hardware implementation can be determined. Then, a reference clock frequency $f_r$ is chosen according to the chosen $m_1$ and to other given parameters such as the maximum data rate jitter and the maximum data transfer rate. Equations (3), (14), and (17) show how the data rate jitter, data transfer rate, and $m_1$ are related to the reference clock frequency $f_r$.

Once the reference clock frequency $f_r$ and the value of $m_1$ are fixed, then equations (3), (14), and (17) indicate that, at the maximum data rate, $\alpha$ reaches minimum and the data rate jitter reaches maximum, and that with a lower data rate, $\alpha$ will increase and the data rate jitter will decrease in proportion.

Using $m_1$ and $m_2$, the number of B packet tokens and the number of A packet tokens may be approximated by the following equation:

$$\begin{aligned} &A: m_1 \\ &B: m_2 \end{aligned} \quad (20)$$

In order to distribute the $m_1$ A packet tokens and the $m_2$ B packet tokens in a way to reduce the accumulated data rate jitter, an approach similar to equation (8) may be adopted. For the most part, this redistribution of the A packet tokens and the B packet tokens may be done in three steps in order to reduce the accumulated data rate jitter to a tolerance level. These three steps are given by the corresponding equations (21), (22), and (23) as follows:

$$\begin{aligned} &p_1A+B: m_2 \\ &A: m_3 \end{aligned} \quad (21)$$

$$p_2(p_1A+B)+A: m_3$$

$$p_1A+B: m_4 \quad (22)$$

$$(p_2+1)(p_1A+B)+A: m_4$$

$$p_2(p_1A+B)+A: m_3-m_4 \quad (23)$$

Equations (21) and (22) are obtained by operation of equation (8), and equation (23) is obtained by changing equation (22) to a form that allows an easier hardware implementation. Equation (23) then can be re-written according to the following equation:

$$\begin{aligned} &a_1(dA+B)+bA: c_1 \\ &a_2(dA+B)+bA: c_2 \end{aligned} \quad (24)$$

where $a_1=a_2+1=p_2+1$, $b=1$ or $0$, $d=p_1$, $c_1=m_4$, and $c_2=m_3-m_4$. The parameters $a_1$, $a_2$, $b$, $c_1$, $c_2$, and $d$ are the parameters downloaded from the SCSI disk 42 to the data rate controller 64 under control of the host computer 50.

Figures 11A, 11B:
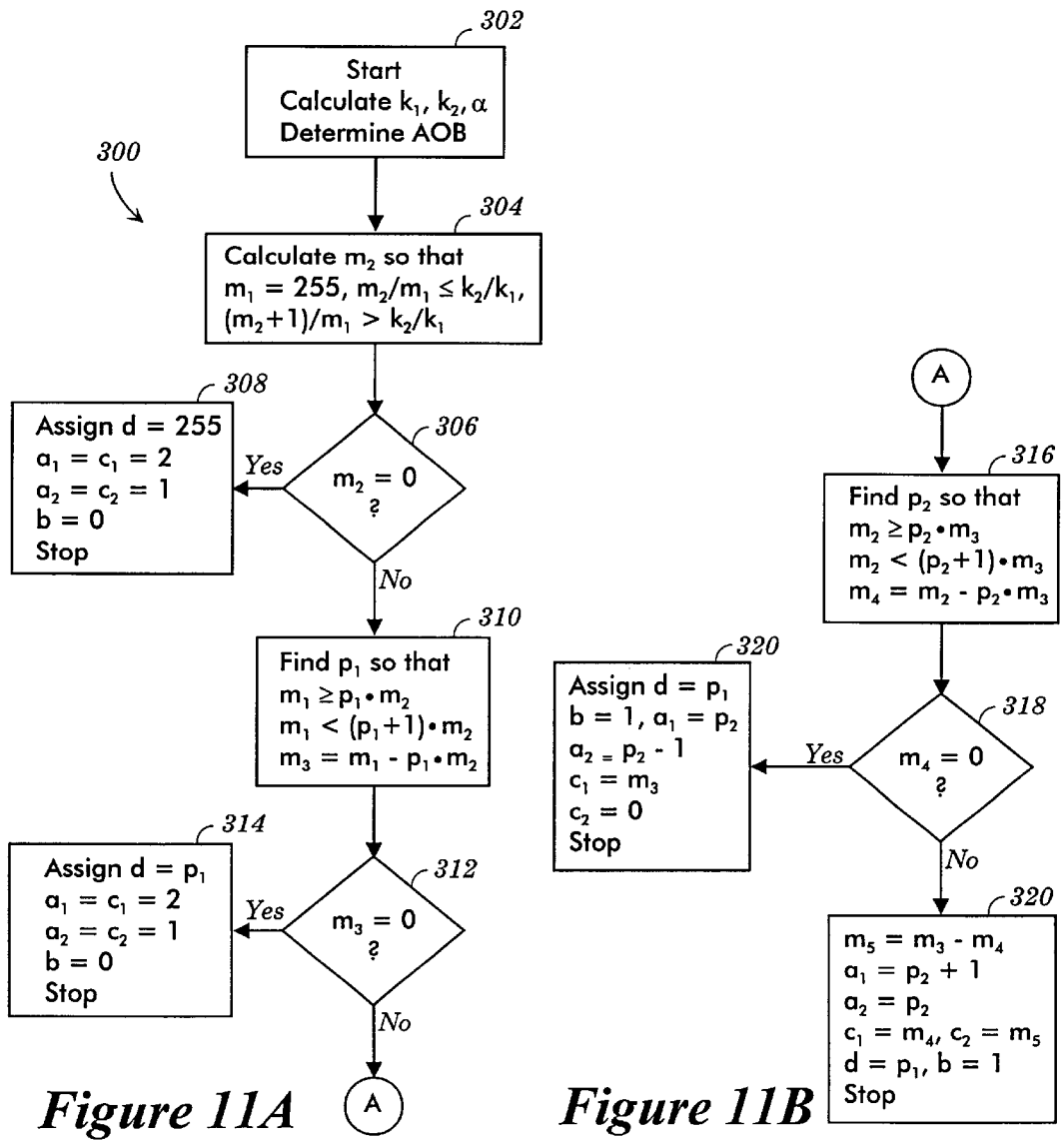
FIGS. 11A and 11B illustrate a procedure for calculating parameters useful by a packet token generator in generating packet tokens according to the present invention.

FIGS. 11A and 11B illustrate a procedure 300 for determining the parameters $a_1$, $a_2$, $b$, $c_1$, $c_2$, and $d$. The procedure 300 is started at a block 302 where the values for $k_1$, $k_2$, and $\alpha$ are calculated as described above. Also, AOB is a procedure which determines whether A packet tokens or B packet tokens are generated every $\alpha$ clock cycles in view of the condition that $k_1>k_2$. That is, the values of $f_0$ and $f_r$ may result in a condition where $k_1<k_2$. (As discussed above, $k_1$ is the number of A packet tokens and $k_2$ is the number of B packet tokens that should be generated.) If so, the values for $k_1$ and $k_2$ are switched so that $k_1$ is always greater than $k_2$ and so that the packet tokens having the greater number as determined by the procedure described above are designated as A packet tokens and the packet tokens having the lesser number as determined by the procedure described above are designated as B packet tokens. If $k_1$ and $k_2$ are switched, then each A packet token is generated after $(\alpha+1)$ reference clocks and each B packet token is generated after $\alpha$ reference clocks.

At a block 304, $m_1$ is set at 255, as discussed above. However, it should be noted that the value of $m_1$ may be chosen to be any number which results in the data rate jitter being a tolerable value and which simplifies the packet token generator. Also at the block 304, $m_2$ is selected so that the following conditions (25) and (26) exist:

$$\frac{m_2}{m_1} \leq \frac{k_2}{k_1} \qquad (25)$$

$$\frac{m_2+1}{m_1} > \frac{k_2}{k_1} \qquad (26)$$

If $m_2$ is determined to be 0 at a block 306, then, as shown in a block 308, the value 255 is assigned to the parameter d, the value 2 is assigned to the parameters $a_1$ and $c_1$, the value 1 is assigned to the parameters $a_2$ and $b_2$, and the value 0 is assigned to the parameter b. The procedure 300 then stops at the block 308.

On the other hand, if $m_2$ is not determined to be 0 at the block 306, then, at a block 310, $p_1$ is selected so that the following conditions (27) and (28) exist:

$$m_1 \geq p_1 \cdot m_1 \qquad (27)$$

$$m_1 < (p_1+1) \cdot m_2 \qquad (28)$$

and $m_3$ is determined to the following equation:

$$m_3 = m_1 + p_1 \cdot m_2 \qquad (29)$$

where $m_1$ and $m_2$ are determined at the block 304. If $m_3$ is determined to be 0 at a block 312, then, as shown at a block 314, the value $p_1$ is assigned to the parameter d, the value 2 is assigned to the parameters $a_1$ and $c_1$, the value 1 is assigned to the parameters $a_2$ and $c_2$, and the value 0 is assigned to the parameter b. The procedure 300 stops at the block 314.

On the other hand, if $m_3$ is not determined to be 0 at the block 312, then, at a block 316, $p_2$ is selected so that the following conditions (30) and (31) exist:

$$m_2 \geq p_2 \cdot m_3 \qquad (30)$$

$$m_2 < (p_2+1) \cdot m_3 \qquad (31)$$

and $m_4$ is determined according to the following equation:

$$m_4 = m_2 - p_2 \cdot m_3 \qquad (32)$$

where $m_1$ and $m_2$ are determined at the block 304, and where $m_3$ is determined at the block 310. If $m_4$ is determined to be 0 at a block 318, then, as shown at a block 320, the value $p_1$ is assigned to the parameter d, the value 1 is assigned to the parameter b, the value $p_2$ is assigned to the parameter $a_1$, the value $p_2-1$ is assigned to the parameter $a_2$, the value $m_3$ is assigned to the parameter $c_1$, and the value 0 is assigned to the parameter $c_2$, where $p_1$ is determined at the block 310. The procedure 300 then stops at the block 320.

If $m_4$ is not determined to be 0 at the block 318, then, as shown at a block 322, a value $m_5$ is determined by subtracting $m_4$ from $m_3$, the value $p_2+1$ is assigned to the parameter $a_1$, the value $p_1$ is assigned to the parameter $a_2$, the value $m_4$ is assigned to the parameter $c_1$, the value $m_5$ is assigned to the parameter $c_2$, the parameter $p_1$ is assigned to the parameter d, and the value 1 is assigned to the parameter b. The value $m_3$ is determined at the block 310, the value $m_4$ is determined at the block 316, the value $p_1$ is determined at the block 310, and the value $p_2$ is determined at the block 316. The procedure 300 then stops at the block 322.

If the reference clock frequency $f_r$ is chosen to be 10.762237 MHZ, if $m_1$ is chosen to be 255, and if the maximum data transfer rate $f_0$ is chosen to be 38.76 Mbit/s, then according to Equation (17) above Equation (36) below, the maximum data rate jitter resulting from the procedure 300 is 5 ppm, and the maximum packet timing jitter resulting from the procedure 300 is 3.56 $\mu$s. For better performance in an MPEG application or for other applications, the values of $m_1$ and $f_r$ may be made larger or the design model based upon equation (24) and the procedure 300 may be extended to allow more steps in order to intermix the A and B tokens.

The procedure 300 assumes that the parameters are determined prior to, or by the time of, execution of the block 322 in order to reduce the data rate jitter to a predetermined level.

The packet token generator 400 described below is designed in accordance with equation (24) for an MPEG-2 transport stream server. The first step in designing a packet token generator is to determine the basic requirement of the application. For example, the maximum data transfer rate $f_0$ of the data server 40 is 38.76 Mbit/s, and the minimum data transfer rate $f_0$ of the data server 40 is 512 Kbit/s. As discussed above, the packet timing jitter tolerance for an MPEG-2 decoder is often said to be about 1 ms. Hence the goal for the design of a packet token generator is to ensure that the packet timing jitter of the data server output is substantially smaller than 1 ms for an MPEG-2 application.

The second step is to choose a reference clock frequency $f_r$ for the packet token generator that will satisfy the numbers developed in the first step. Equations (3), (14), and (17) show how the data rate jitter is related to the reference clock frequency $f_r$ with $m_1$ chosen to be 255. If the maximum data rate jitter is chosen to be 5 ppm, then based on equations (3), (14), and (17), the minimum $f_r$ is about 10 MHZ. With such a reference clock frequency $f_r$ and at the maximum data rate of 38.76 Mbit/s, equations (3), (14), and (17) indicate that $\alpha$ raches the minimum of 416, and that the data rate jitter reaches the maximum of 5 ppm. With a lower data rate, $\alpha$ increases and the data rate jitter decreases proportionally.

The third step is to determine the size of the counters for the parameters of Equation (24). First, the counter for the A and B tokens is considered. As mentioned previously, $\alpha$ is the number of reference clocks necessary to generate one A token. Based on the chosen $f_r$ and the minimum data rate of 512 Kbit/s, the maximum value of $\alpha$ can be calculated from Equation (3) such that $$\text{max. } \alpha \approx 31725 < 2^{15}$$

This maximum value of $\alpha$ shows that a sixteen bit counter can be used to generate the A and B tokens. It is apparent that the parameters $a_1$, $a_2$, $c_1$, $c_2$, and d are smaller than $m_3$ which is 255. Hence eight bit counters can be used for those parameters.

The fourth step is to evaluate the packet timing jitter based on the results of the first three steps. From Equations (14), (17), and (33) (described below), the maximum instantaneous data rate jitter generated by the model is $$j_{max} = \frac{10^6}{(13.5) \cdot \alpha} \quad (33)$$

The time required to generate all of the token groups in equation (24) is given by the following expression:

$$t_a = \frac{(m_1 - m_2) \cdot (188) \cdot (8)}{f} \text{ second} \quad (34)$$

The value $t_a$ is the time during which the maximum average data rate jitter is 5 ppm, where the data rate jitter is introduced by using $m_1$ and $m_2$ instead of $k_1$ and $k_2$, respectively, with the assumptions that $m_1$=255, $f_r$=10.762237 MHZ, and the maximum data rate $f_0$ is 38.76 Mbit/s. For simplicity, the 5 ppm data rate jitter may be ignored. Then, based on Equations (33) and (34), the maximum instantaneous packet timing jitter at any time is given by the following expression:

$$j_{pmax} < \left(\frac{j_{max} \cdot f_0}{10^6}\right) \cdot \frac{t_a}{f_0} = \frac{(m_1 + m_2) \cdot (188) \cdot (8)}{(13.5) \cdot \alpha \cdot f_0} \quad (35)$$

If $f_r$=10.762233 MHZ, then the following expression may be derived from Equation (3):

$$j_{pmax} < \frac{(m_1 + m_2) \cdot (188) \cdot (8)}{(13.5) \cdot ((188) \cdot (8) \cdot (f_r - \beta))} < 3.56 \mu s \quad (36)$$

where $\beta < f_0 < 8f_r$. The value $j_{pmax}$ is the maximum edge timing jitter of the packet tokens, and is thus the maximum packet timing jitter. Equation (36) confirms that the packet timing jitter generated by the model is far smaller than 1 ms which is the packet timing jitter tolerance of an MPEG-2 decoder.

Figure 12A:
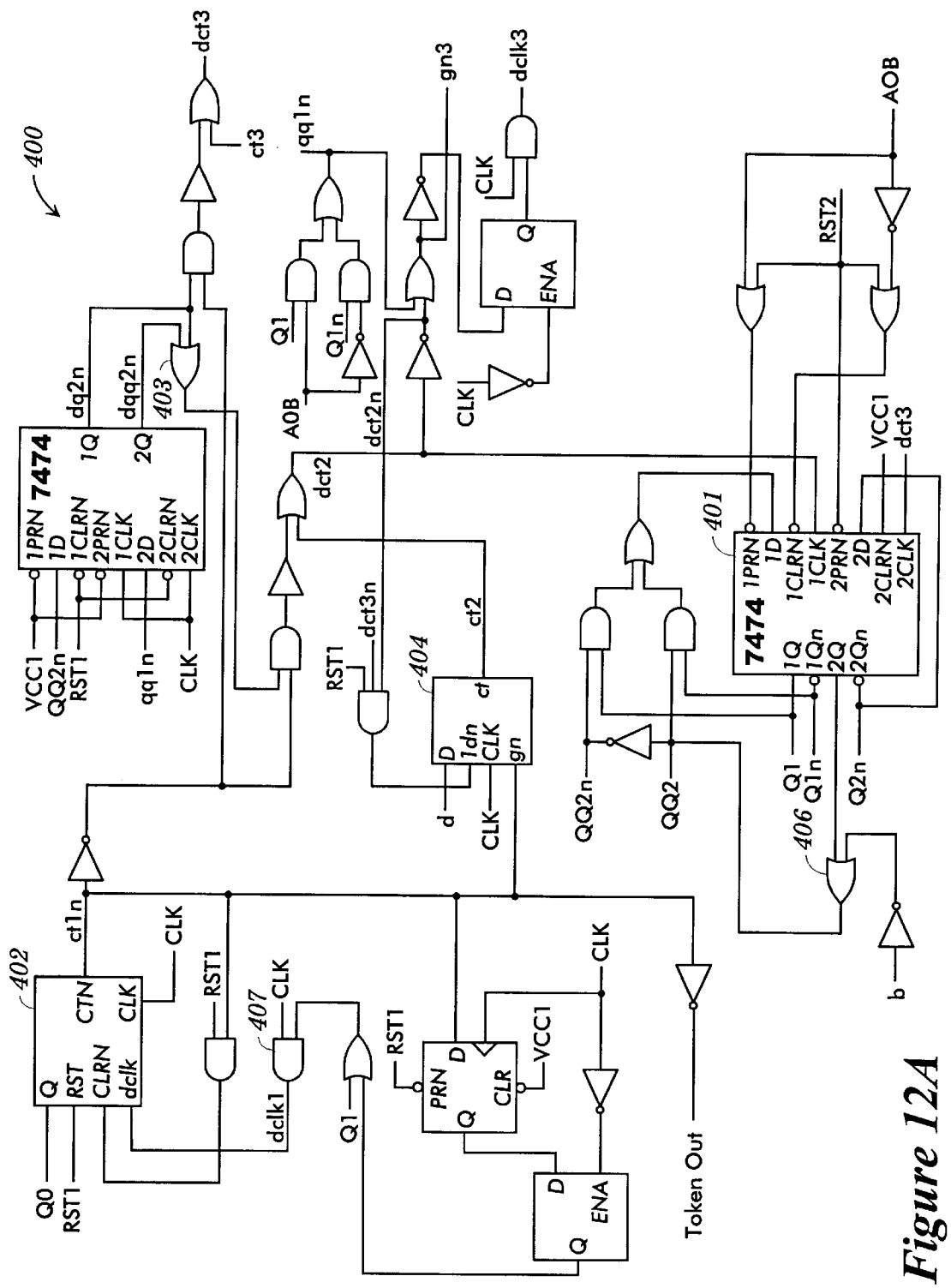
FIGS. 12A, 12B, and 12C illustrate a packet token generator useful in the data server of the present invention.
Figure 12B:
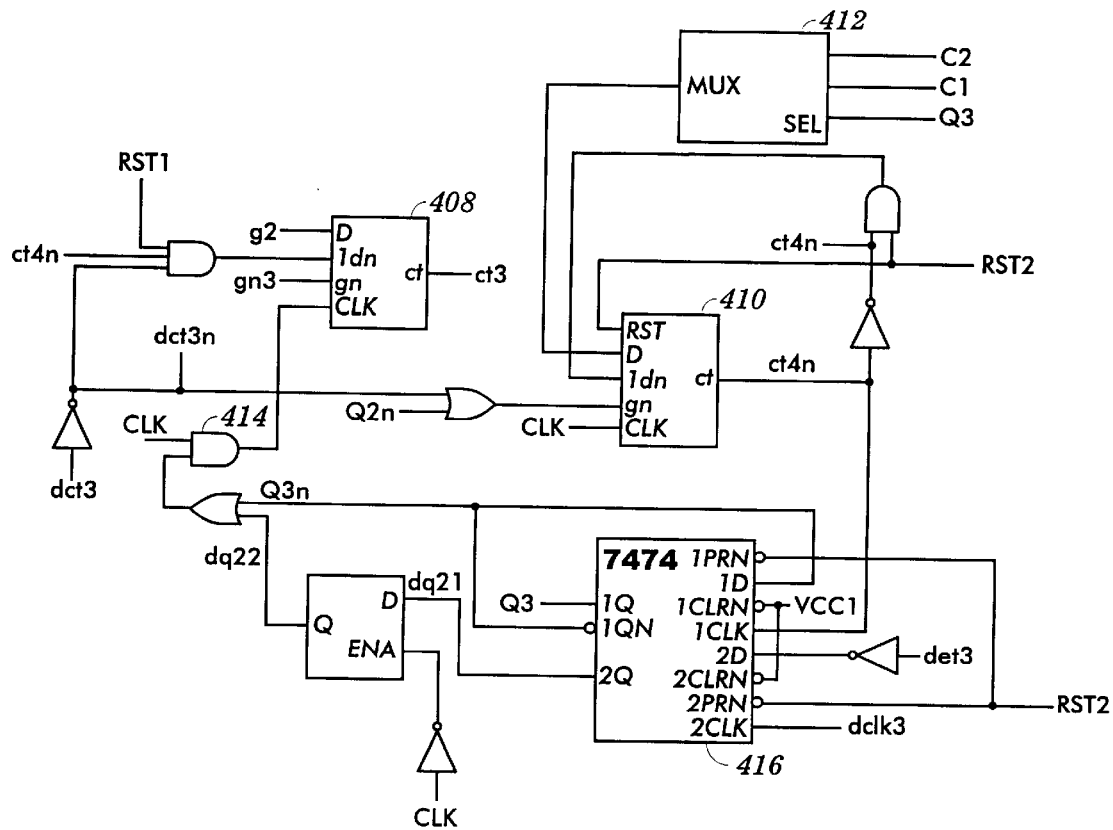
Figure 12C:
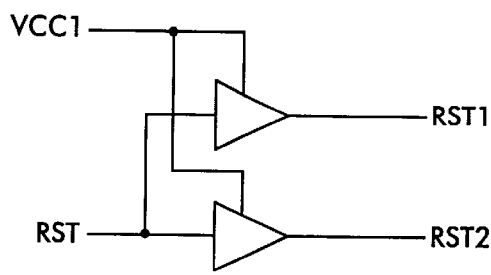

The last step of designing a packet token generator is the schematic realization of the model provided by equation (24). This schematic of the packet token generator 400 is illustrated in FIGS. 12A, 12B, and 12C. The clock input, as shown at many locations in FIGS. 12A, 12B, and 12C, is the reference clock $f_r$. It has been discussed above that the A tokens and the B tokens are generated by $\alpha$ and $\alpha$+1 reference clock cycles, respectively. In order to derive the packet token generator 400 from equation (24), it is assumed that $k_1 \geq k_2$ is always true. In an actual application, however, this condition may not always be satisfied. To maintain the condition $k_1 \geq k_2$ always true, the larger number among $k_1$ and $k_2$ is always assigned to $k_1$, and the corresponding token is assigned as the token A. In that way, the A tokens in Equation (7) are generated by either $\alpha$ or $\alpha$+1 reference clock cycles.

In the schematic of the packet token generator 400, a signal AOB is used to indicate whether $k_1$ retains its original value or whether the values of $k_1$ and $k_2$ must be switched in order to satisfy the condition $k_1 \geq k_2$. Thus, when AOB=0, $k_1$ is assigned its original value, and the A tokens are generated each $\alpha$ reference clock cycles. However, when AOB=1, the values of $k_1$ and $k_2$ are switched, and the A tokens are generated each $\alpha$+1 reference clock cycles.

Since the A and B tokens always differ by one reference clock, they can be counted by one counter 402. The counter 402 of the packet token generator 400 is a sixteen bit counter which counts down from the value of $a_0$, where the value of $a_0$ is set equal to $\alpha$. When the counter 402 is required to count the tokens generated by $\alpha$+1 reference clocks in order to generate a B token, one reference clocks pulse is dropped from the input of the counter 402 by an AND gate 407. The same operation is used by a counter 408 to count the parameters $a_1$ and $a_2$ in equation (24) because $a_1 = a_2 + 1$. Because $a_2 < 256$, the counter 408 may be an eight bit counter. Thus, when it is required for the counter 408 to count $a_1 = a_2 + 1$, one reference clock pulse is dropped from the input of the counter 408 by an AND gate 414. A counter 404 receives the parameter d in order to count d A packet tokens. The parameter b is inverted and supplied to an OR gate 406. A counter 410 receives either the parameter $c_1$ or the parameter $c_2$ through a multiplexer 412 and, therefore, counts either (i) $c_1$ super-superpacket tokens each comprising $a_1$ superpacket tokens (where a superpacket token has d A packet tokens and one B packet token) and b A packet tokens or (ii) $c_2$ super-superpacket tokens comprising $a_2$ superpacket tokens (where a superpacket token has d A packet tokens and one B packet token) and b A packet tokens.

After the parameters are loaded (which is described below in connection with FIGS. 13A–13D), the signal RST goes high (also described below in connection with FIGS. 13A–13D), which starts the packet token generator 400. The terminals VCC1 represent, for example, a 15 volt power supply. The operation of the packet token generator 400 is described in the following three sections.

1. The Counting of $a_1$(dA+B)—See Equation (24)

If it is assumed that AOB is equal to one, then A and B tokens are generated by a0+1 and a0 reference clocks, respectively, where a0 is $\alpha$. While AOB=1 and RST2=0, Q1=0, which allows the signal dq11 to control the signal dclk1. The signal dclk1 is the clock signal for the counter 402. Each time the counter 402 counts a0 reference clocks, the signal ctln goes low, enabling the counter 404 to count one, so that the count of the parameter d counter 404 is increased by one. Also, when the signal ctln goes low, the signal dq11 is clocked low for one reference clock cycle. Thus one dclk1 clock pulse is dropped from the dclk clock input of the counter 402. In this way, every A token (marked by ctln going low) is generated by a0+1 reference clocks.

After the signal ctln goes low for d reference clock times as determined by the counter 404, d A tokens have been generated. After the signal ctln goes low d times, the output signal ct2 of the counter 404 goes high. Because QQ2=1 at this time, the output signal ct2 going high toggles the D flip-flop 401, causing Q1 to go high. A high on Q1 blocks control of the signal dclk1 by the signal dq11. Thus, no clock pulse will be dropped, and the next token will be generated at a0 reference clocks. This token is a B token. With Q1=1 and AOB=1, the signal qq1n is set to 1. When qq1n=1, the signal dqq1n is set to one. When the signal qq1n=1, a low signal dct2n prevents the gate signal gn3 from being low so that the counter 408 is inhibited from counting at this time. When one B token is counted and the signal ctln goes low, the signal dct2 goes high because the signal dqq1n is equal to one. Thus, Q1 is toggled again and becomes low. When Q1 is low, the signal qq1n is low. Because the signal dct2n is low and the signal qq1n is held low for one reference clock cycle, the counter 408 is enabled to count one after each B token is counted. When Q1 is low, the signal dq11 is allowed to drop reference clock pulses in order to count A tokens. Meanwhile a low on Q1 sets the signal dqq1n low. Because the signal QQ2n is low at this time, the output of the OR gate 403 is low. Thus, the signal ctln going low will not toggle Q1, allowing the packet token generator 400 to count d A tokens.

2. The Counting of $a_1$ and $a_2$—See Equation (24)

The counter 408 is loaded with the parameter $a_1$. When the parameter $a1=a2+1$ is being counted by the counter 408, a reference clock pulse has to be dropped at the clock input of the counter 408. The dropping of the reference clock pulse is controlled by the signals Q3n and dq22. According to equation (24), the parameter $a_1$ is counted while the parameter $c_1$ is counted, and the parameter $a_2$ is counted while the parameter $c_2$ is counted. The switching between counting of the $a_1$ parameter and the $a_1$ parameter can be controlled by the counter 410.

When the packet token generator 400 is started, the parameter $c_1$ is counted and the signal Q3n is low. When the counter 408 has counted the parameter $a_2$, the signal ct3 goes high and the signal dct3n goes low. The low of the signal dct3n is clocked by a D flip-flop 416 to cause the signal dq22 to go low. The signal dq22 is kept low until the inverse of the next low of the gate signal gn3 is clocked through two latches and one D flip-flop to set it high again. During that time, the lows of the signals Q3n and dq22 cause one clock pulse to be dropped from the signal dclk2 when the gate signal gn3 is low. Thus, while the parameter $c_1$ is counted, the counter 408 in fact counts a2+1 reference clocks for each pulse of the signal ct3.

After the parameter c1 is counted by the counter 410, the signal ct4 goes high which toggles the signals Q3 and Q3n such that Q3 is toggled low and Q3n is toggled high. When Q3 is toggled low, the counter 410 is switched to counting of the parameter $c_2$. When Q3n is toggled high, a reference clock pulse is prevented from being dropped from the signal dclk2. Thus, during the counting of the parameter $c_2$, the counter 408 counts $a_2$ reference clocks.

3. The Counting of bA of—See Equation (24)

When the parameter b is 1, Q2n is always equal to QQ2n. At the beginning of token generation, Q2n=QQ2n=0. The packet token generator 400 counts $a_1$ token during groups (dA+B). After the parameter $a_1$ is counted during which $a_1$ token groups (dA+B) are produced, the signals ct3 and dct3 go high, which toggles QQ2n and Q2n to highs. When the high of QQ2n is clocked, dq2n goes high. When dq2n goes high, a high ct1 causes dct3 to go high and dct3n to go low. After the parameter $a_1$ is counted, the counter 402 starts to count a single A token (because b=1). After one A token is counted, the signal ct1 again goes high, causing the signal dct3 to go high and the signal dct3n to go low. While the signal Q2n is high and the signal dct3n is low, the counter 410 does not count, because at this time a low signal dct3n does not mean the end of the counting of the token group $a_1$(dA+B)+bA or the token group $a_2$(dA+B)+bA, as appropriate. However, when the signal dct3 goes high, the signals QQ2n and Q2n are toggled to low again, and the multiplexer 412 is switched to $c_2$, which causes the packet token generator 400 to start counting the token group $a_2$(dA+B). After the parameter $a_2$ is counted, the above procedure repeats again, allowing the packet token generator 400 to count a single A token, thus finishing the counting of the token group $a_2$(dA+B)+bA.

On the other hand, when the parameter b is zero, the signals QQ2n and Q2n are always low. Thus, the signal ct1 is never directly passed to dct3, and a single A token is never counted after the counting of the token groups $a_1$(dA+B) and $a_2$(dA+B).

Figure 13A:
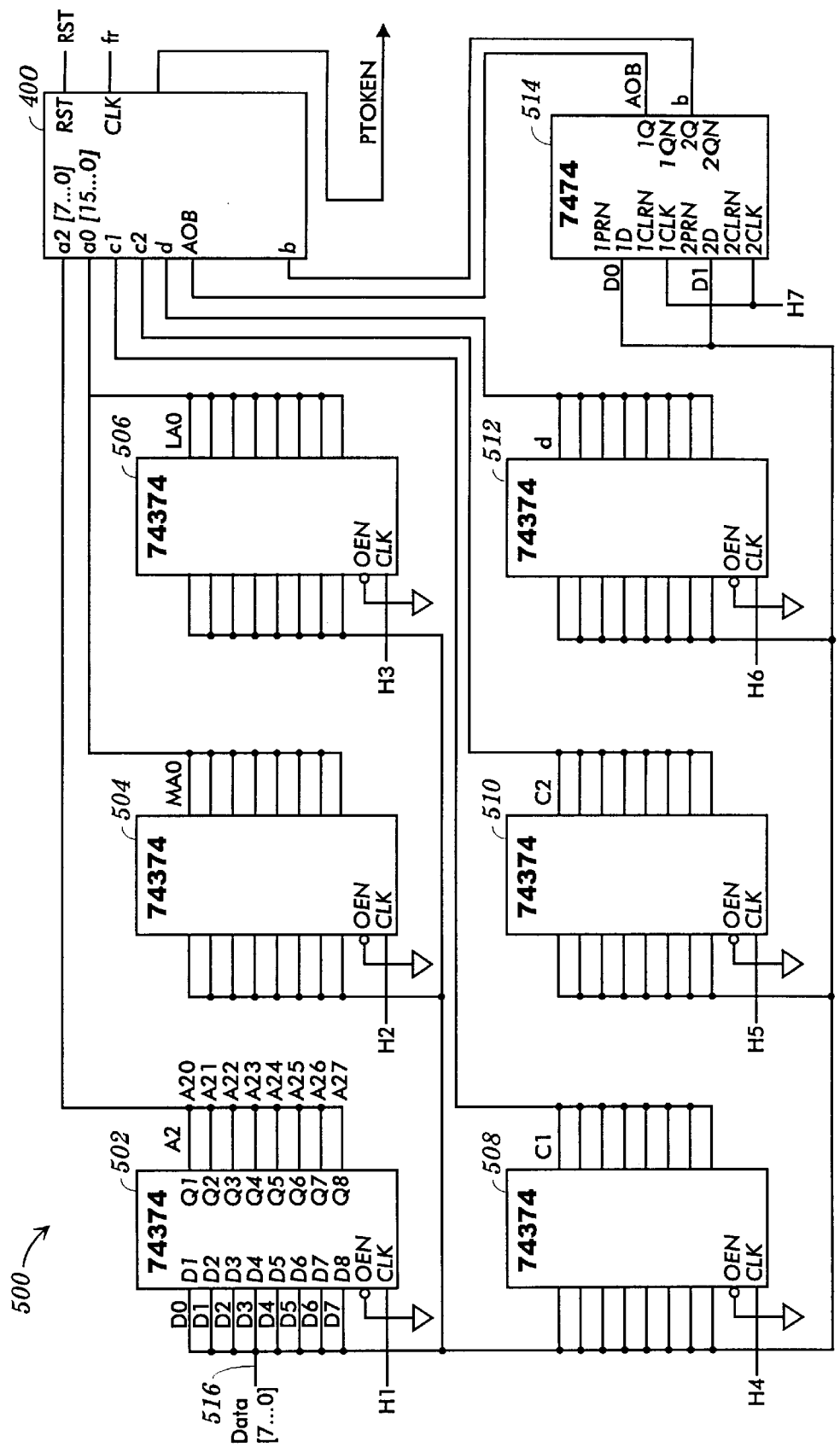
FIGS. 13A, 13B, 13C, and 13D illustrate a latch, and a state machine for setting the latch, in order to supply parameters that are used by the packet token generator of FIGS. 12A, 12B, and 12C in generating packet tokens; and, FIG. 14 illustrates the data output interface of FIG. 3 in additional detail.
Figure 13B:
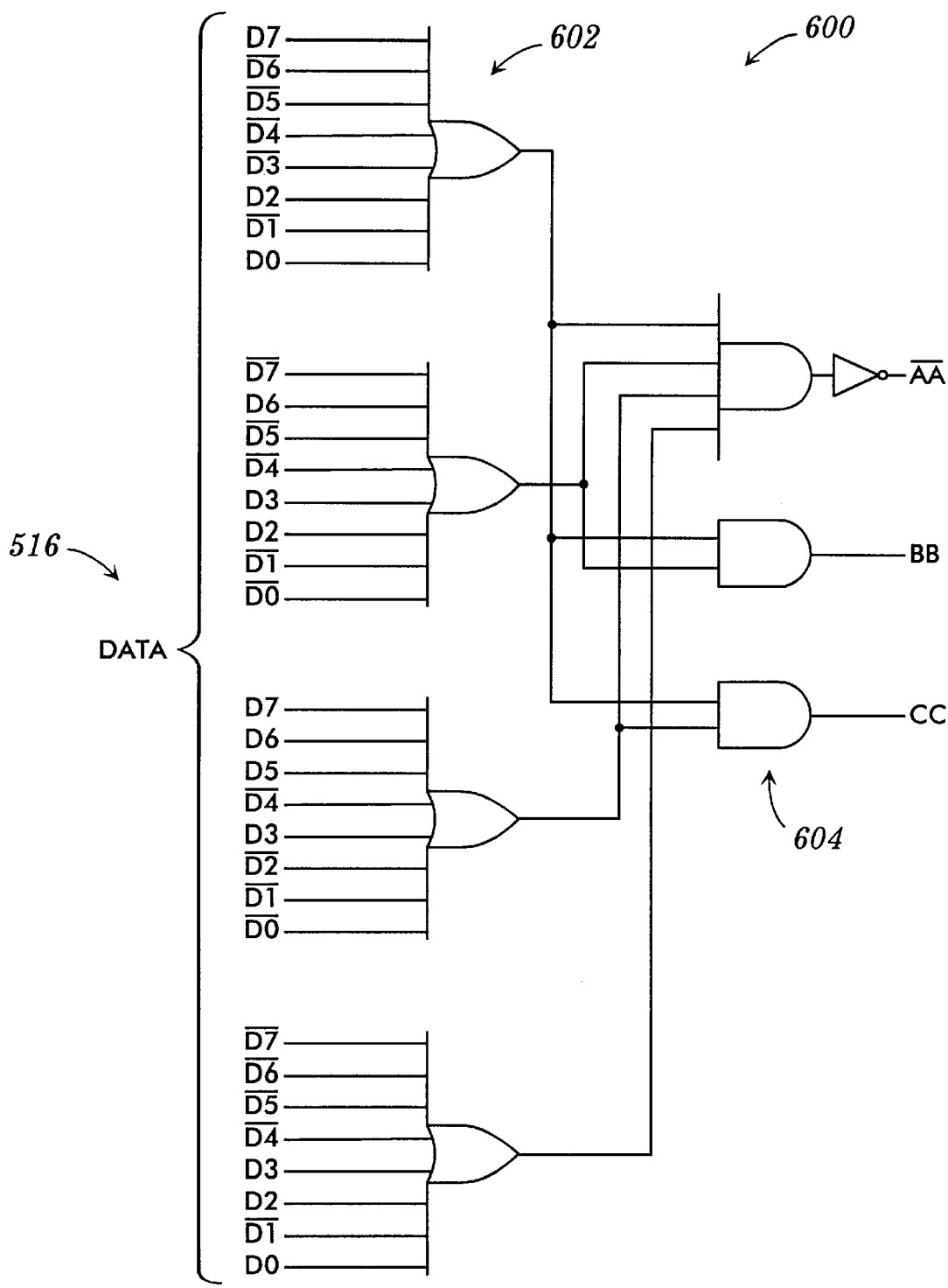
Figure 13C:
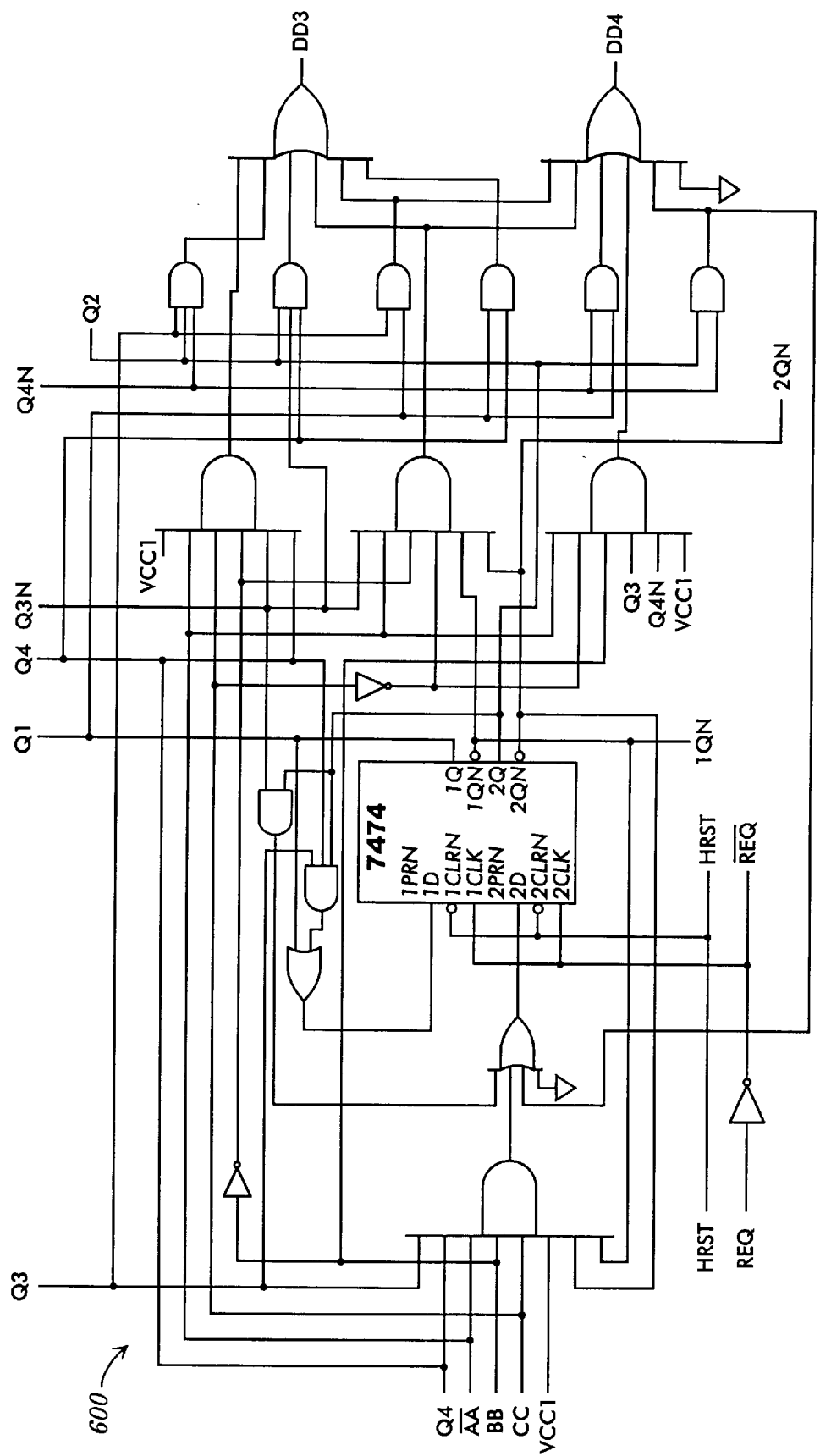
Figure 13D:
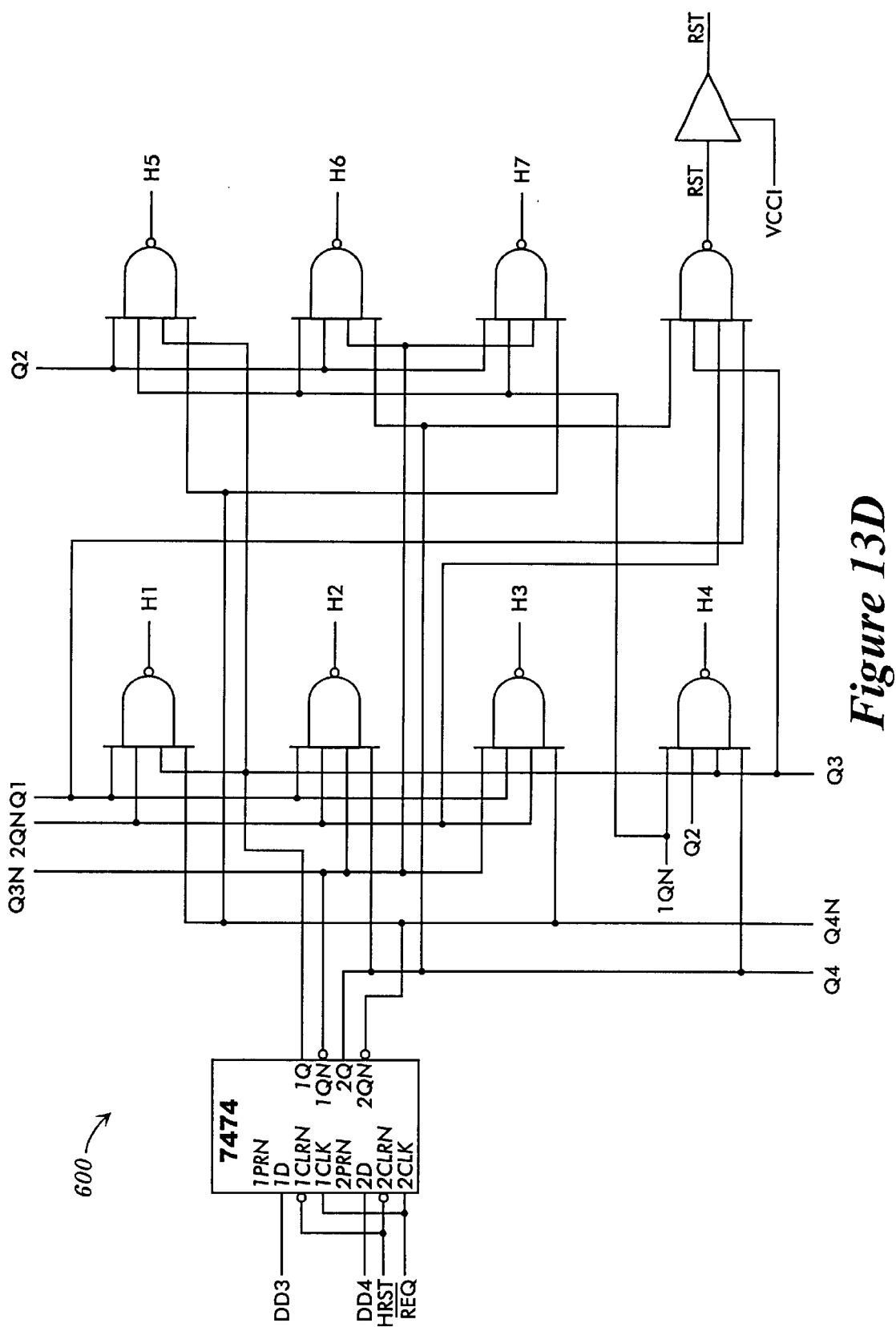

The data rate controller 64 also includes a latch 500 shown in FIG. 13A and a state machine 600 shown in FIGS. 13B, 13C, and 13D. The state machine 600 responds to the key words in the parameter files stored on the SCSI disk 42 in order to start the state machine 600 to load the latch 500 with the parameters that follow the key word state of the parameter files. As discussed above, these parameters are used by the packet token generator 400 of FIGS. 12A, 12B, and 12C to generate packet tokens at any given data rate from 512 Kbit/s to 38.76 Mbit/s.

The latch 500 includes first, second, third, fourth, fifth, sixth, and seventh parameter latches 502, 504, 506, 508, 510, 512, and 514. The first parameter latch 502 receives parameter information relating to the parameter $a_2$ over the data bus 516 of the SCSI bus 46 and latches the parameter $a_2$ for supply to the packet token generator 400. The second parameter latch 504 receives parameter information relating to a first portion (for example, the most significant bits) of the parameter $a_0$ over the data bus 516 of the SCSI bus 46 and latches this first portion of the parameter $a_2$ for supply to the packet token generator 400. The third parameter latch 506 receives parameter information relating to a second portion (for example, the least significant bits) of the parameter $a_3$ over the data bus 516 of the SCSI bus 46 and latches this second portion of the parameter $a_1$ for supply to the packet token generator 400. The parameter $a_0$ is the value α determined from equation (4) as discussed above.

The fourth parameter latch 508 receives parameter information relating to the parameter $c_1$ over the data bus 516 of the SCSI bus 46 and latches the parameter $c_1$ for supply to the packet token generator 400. The fifth parameter latch 510 receives parameter information relating to the parameter $c_2$ over the data bus 516 of the SCSI bus 46 and latches the parameter c for supply to the packet token generator 400. The sixth parameter latch 512 receives parameter information relating to the parameter d over the data bus 516 of the SCSI bus 46 and latches the parameter d for supply to the packet token generator 400. The seventh parameter latch 514 receives parameter information relating to the parameters b and AOB over the data bus 516 of the SCSI bus 46 and latches the parameters b and AOB for supply to the packet token generator 400.

The state machine 600 receives the state instructions contained in the parameter files stored on the SCSI disk 42. These state instructions, for example, may comprise four key words which may be arbitrarily chosen (provided the state machine 600 is designed for the key words) and which set the state machine 600 to an initial state. From this initial state, the state machine responds to the SCSI protocol REQ pulses transmitted with each parameter in order to change states so that each parameter is sequentially latched into a corresponding parameter latch.

The state machine 600 includes a plurality of OR gates 602 and a plurality of NAND gates 604. The OR gates 602 and the NAND gates 604 decode the key words on data lines 0–7 of the data bus 516 in order to generate a set of state machine setting signals $\overline{AA}$, BB, and CC. The signals on these data lines are inverted and not inverted as indicated in FIG. 13B before being supplied to the OR gates 602. The state machine setting signals $\overline{AA}$, BB, and CC change upon the receipt of each keyword and are processed by the portions of the state machine 600 shown in FIGS. 13C and 13D. After the state machine setting signals $\overline{AA}$, BB, and CC are processed by the portions of the state machine 600 shown in FIGS. 13C and 13D, the state machine 600 is set to its initial state.

Thereafter, when the state machine 600 receives the parameter $a_2$ along with its REQ pulse, the REQ pulse causes the state machine 600 to increment to a first state in order to produce a clock signal on the line H1 (FIGS. 13D and 13A) that latches the parameter $a_2$ to the output of the first parameter latch 502. When the state machine 600 next receives the first portion of the parameter $a_0$ along with its REQ pulse, the REQ pulse causes the state machine 600 to increment to a second state in order to produce a clock signal on the line H2 that latches the first portion of the parameter $a_0$ to the output of the second parameter latch 504.

When the state machine 600 next receives the second portion of the parameter $a_0$ along with its REQ pulse, the REQ pulse causes the state machine 600 to increment to a third state in order to produce a clock signal on the line H3 that latches the second portion of the parameter $a_0$ to the output of the third parameter latch 506. When the state machine 600 receives the parameter $c_1$ along with its REQ pulse, the REQ pulse causes the state machine 600 to increment to a fourth state in order to produce a clock signal on the line H4 that latches the parameter $c_1$ to the output of the fourth parameter latch 508.

When the state machine 600 receives the parameter $c_2$ along with its REQ pulse, the REQ pulse causes the state machine 600 to increment to a fifth state in order to produce a clock signal on the line H5 that latches the parameter $c_2$ to the output of the fifth parameter latch 510. When the state machine 600 receives the parameter d along with its REQ pulse, the REQ pulse causes the state machine 600 to increment to a sixth state in order to produce a clock signal on the line H6 that latches the parameter d to the output of the sixth parameter latch 512.

When the state machine 600 receives the parameters b and AOB along with their REQ pulse, the REQ pulse causes the state machine 600 to increment to a seventh state in order to produce a clock signal on the line H7 that latches the parameters b and AOB to corresponding outputs of the seventh parameter latch 514. When the state machine 600 receives the next REQ pulse, this REQ pulse causes the state machine 600 to increment to an eighth state in order to reset the RST signal, and the state machine 600 locks itself into an inactive state. The reset of the signal RST causes RST to go high which starts the packet token generator 400 generating a stream of packet tokens according to the rate determined by the parameters. A high RST also starts the procedure to switch the control of the SCSI signal ACK from the SCSI bus adapter 48 to the application 44, and also starts the SCSI bus and buffer controller 60.

Figure 14:
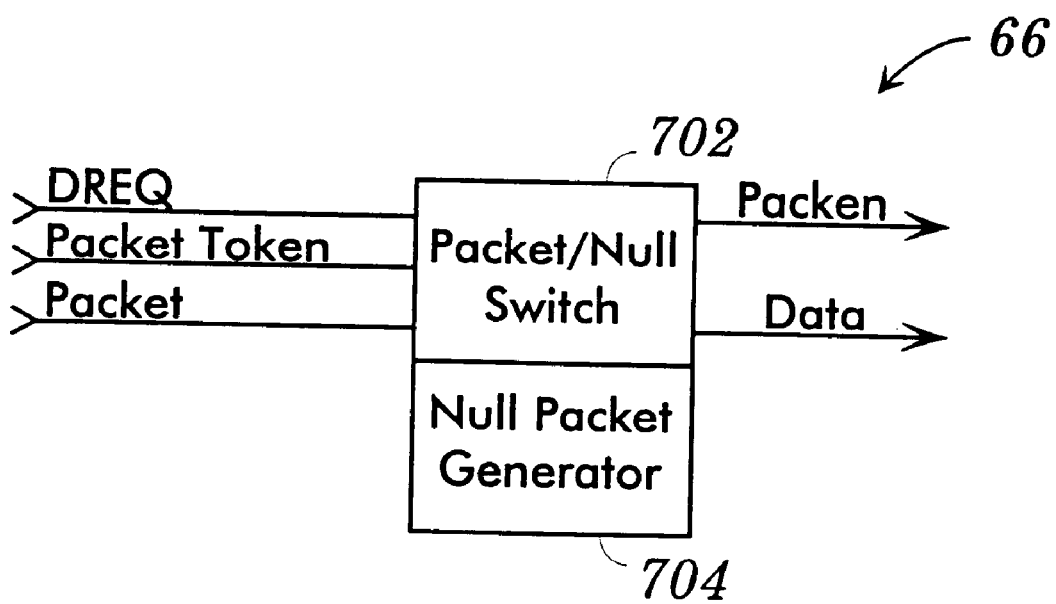

As shown in FIG. 14, the data output interface 66 includes a packet null switch 702 and a null packet generator 704. The packet null switch 702 receives packet tokens from the packet token generator 400 and DREQ pulses over the application data bus 68. If the packet null switch 702 detects the presence of both a DREQ pulse and a packet token at the same time, the packet null switch 702 supplies a packet enable signal (on PACKEN) to the buffer controller 80 in order to retrieve a data packet from the SRAM buffer 62 (over PACKET), and supplies this packet to the application data bus 68. On the other hand, if the packet null switch 702 receives a DREQ pulse and does not detect a packet token coincidentally, the packet null switch 702 enables the null packet generator 704 in order to generate a null packet, and supplies this null packet to the application data bus 68.

Certain modifications of the present invention have been discussed above. Other modifications will occur to those practicing in the art of the present invention. For example, the switching portion 100, the SCSI bus controlling portion 130, and the packet token generator 400 are shown as comprising discrete logic elements. However, the functions performed by the switching portion 100, by the SCSI bus controlling portion 130, and by the packet token generator 400 may be performed by software, by programmable logic arrays, and/or the like.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A data server comprising:
    a storage disk, wherein the storage disk stores data;
    an SCSI bus connected to the storage disk and arranged to transfer the data from the storage disk;
    an SCSI bus adapter connected to the SCSI bus;
    a host computer arranged to control the SCSI bus adapter; and,
    an application connected to the SCSI bus, wherein the application is arranged to receive the data transferred by the SCSI bus and to control the transfer of the data from the storage disk.

2. The data server of claim 1 wherein the host computer is arranged to instruct the SCSI bus adapter to disregard the data transferred from the storage disk to the application.

3. The data server of claim 1 wherein the host computer is arranged to instruct the SCSI bus adapter to retrieve a parameter file from the storage disk, and wherein the parameter file relates to data to be transferred from the storage disk to the application.

4. The data server of claim 1 wherein the host computer is arranged to initiate data transfer from the storage disk to the application.

5. The data server of claim 4 wherein the host computer is arranged to instruct the SCSI bus adapter to disregard the data transferred from the storage disk to the application.

6. The data server of claim 1 wherein the application includes a switch, and wherein the switch is arranged to switch control of data transfer between SCSI bus adapter and the application.

7. The data server of claim 6 wherein the switch includes an acknowledgment selector, and wherein the acknowledgment selector is arranged to select whether acknowledgments from the SCSI bus adapter or acknowledgments from the application are passed to the storage disk.

8. The data server of claim 7 wherein the acknowledgment selector passes acknowledgments from the application to the storage disk during periods when data is being transferred from the storage disk to the application, and wherein the acknowledgment selector passes acknowledgments from the SCSI bus adapter to the storage disk during periods when data is not being transferred from the storage disk to the application.

9. The data server of claim 1 wherein the application includes a data rate controller, and wherein the data rate controller is arranged to control the rate at which data is transferred from the storage disk to the application.

10. The data server of claim 9 wherein the data rate controller includes an acknowledgment generator, wherein the acknowledgment generator is arranged to generate acknowledgments based upon data received from the storage disk, and wherein the acknowledgment generator sends the acknowledgments to the storage disk.

11. The data server of claim 10 wherein the acknowledgment generator is further arranged to generate a predetermined number of acknowledgments at a time when data transfer from the storage disk is to resume.

12. The data server of claim 9 wherein the application includes a buffer memory, wherein the data rate controller includes an acknowledgment generator, wherein the acknowledgment generator is arranged to generate acknowledgments responsive to a status of the buffer memory and to data received from the storage disk, and wherein the acknowledgment generator sends the acknowledgments to the storage disk.

13. The data server of claim 9 wherein the application includes a switch, and wherein the switch is arranged to switch control of data transfer between the SCSI bus adapter and the application.

14. The data server of claim 1 wherein the application includes an acknowledgment generator that is arranged to generate a predetermined number of acknowledgments when data transfer from the SCSI disk is to resume.

15. An SCSI data server comprising:
   an SCSI memory, wherein the SCSI memory stores data;
   an SCSI bus connected to the SCSI memory;
   an SCSI controller connected to the SCSI bus, wherein the SCSI controller is arranged to initiate transfer of the data from the SCSI memory; and,
   an application connected directly to the SCSI bus, wherein the application is arranged to use the data transferred over the SCSI bus and to control the transfer of the data from the SCSI memory after the transfer of the data has been initiated by the SCSI controller.

16. The data server of claim 15 wherein the SCSI controller is arranged to disregard the data transferred from the SCSI memory to the application.

17. The data server of claim 16 wherein the application includes a switch, and wherein the switch is arranged to switch control of data transfer between the SCSI controller and the application.

18. The data server of claim 17 wherein the switch includes an acknowledgment selector, and wherein the acknowledgment selector is arranged to select whether acknowledgments from the SCSI controller or acknowledgments from the application are passed to the SCSI memory.

19. The data server of claim 17 wherein the application includes a data rate controller, and wherein the data rate controller is arranged to control the rate at which data is transferred from the SCSI memory to the application.

20. The data server of claim 19 wherein the data rate controller includes an acknowledgment generator, wherein the acknowledgment generator is arranged to generate acknowledgments based upon data received from the SCSI memory, and wherein the acknowledgment generator sends the acknowledgments to the SCSI memory.

21. The data server of claim 20 wherein the switch includes an acknowledgment selector, and wherein the acknowledgment selector is arranged to select whether acknowledgments from the SCSI controller or acknowledgements from the application are passed to the SCSI memory.

22. The data server of claim 19 wherein the application includes an acknowledgment generator that is arranged to generate a predetermined number of acknowledgments when data transfer from the SCSI memory is to resume.

23. The data server of claim 16 wherein the application includes a data rate controller, and wherein the data rate controller is arranged to control the rate at which data is transferred from the SCSI memory to the application.

24. The data server of claim 23 wherein the data rate controller includes an acknowledgment generator, wherein the acknowledgment generator is arranged to generate acknowledgments based upon data received from the SCSI memory, and wherein the acknowledgment generator sends the acknowledgments to the SCSI memory.

25. The data server of claim 23 wherein the application includes an acknowledgment generator that is arranged to generate a predetermined number of acknowledgments when data transfer from the SCSI memory is to resume.

26. The data server of claim 15 wherein the application includes a switch, and wherein the switch is arranged to switch control of data transfer between the SCSI controller and the application.

27. The data server of claim 26 wherein the switch includes an acknowledgment selector, and wherein the acknowledgment selector is arranged to select whether acknowledgments from the SCSI controller or acknowledgments from the application are passed to the SCSI memory.

28. The data server of claim 26 wherein the application includes a data rate controller, and wherein the data rate controller is arranged to control the rate at which data is transferred from the SCSI memory to the application.

29. The data server of claim 28 wherein the data rate controller includes an acknowledgment generator, wherein the acknowledgment generator is arranged to generate acknowledgments based upon data received from the SCSI memory, and wherein the acknowledgment generator sends the acknowledgments to the SCSI memory.

30. The data server of claim 28 wherein the switch includes an acknowledgment selector, and wherein the acknowledgment selector is arranged to select whether acknowledgments from the SCSI controller or acknowledgments from the application are passed to the SCSI memory.

31. The data server of claim 26 wherein the application includes an acknowledgment generator that is arranged to generate a predetermined number of acknowledgments when data transfer from the SCSI memory is to resume.

32. The data server of claim 15 wherein the application includes a data rate controller, and wherein the data rate controller is arranged to control the rate at which data is transferred from the SCSI memory to the application.

33. The data server of claim 32 wherein the data rate controller includes an acknowledgment generator, wherein the acknowledgment generator is arranged to generate acknowledgments based upon data received from the SCSI memory, and wherein the acknowledgment generator sends the acknowledgments to the SCSI memory.

34. The data server of claim 15 wherein the application includes an acknowledgment generator that is arranged to generate a predetermined number of acknowledgments when data transfer from the SCSI memory is to resume.

35. The data server of claim 15 wherein the application includes an acknowledgment selector, and wherein the acknowledgment selector is arranged to select whether acknowledgments from the SCSI controller or acknowledgments from the application are passed to the SCSI memory.

36. A data server comprising:
   a storage disk, wherein the storage disk stores data;
   an SCSI bus connected to the storage disk and arranged to transfer the data from the storage disk;
   an SCSI bus adapter connected to the SCSI bus;
   a host computer arranged to control the SCSI bus adapter; and,
   an application connected to the SCSI bus, wherein the application includes a switch arranged to switch control of the SCSI bus from the SCSI bus adapter to the application, and wherein the application includes a data rate controller arranged to control the rate at which data is transferred from the SCSI disk to the application.

37. The data server of claim 36 wherein the SCSI bus adapter is arranged to disregard the data on the SCSI bus.

38. The data server of claim 36 wherein the data rate controller includes an acknowledgment generator arranged to generate acknowledgments in order to control the rate at which data is transferred from the storage disk to the application.

39. The data server of claim 36 wherein the application includes an acknowledgment generator that is arranged to generate a predetermined number of acknowledgments when data transfer from the SCSI memory is to resume.

* * * * *